US009997196B2

(12) United States Patent
Wang et al.

(10) Patent No.: US 9,997,196 B2
(45) Date of Patent: Jun. 12, 2018

(54) RETIMING MEDIA PRESENTATIONS

(75) Inventors: Xiaohuan C. Wang, Sunnyvale, CA (US); Giovanni Agnoli, San Mateo, CA (US); David N. Chen, San Jose, CA (US); Vijay Sundaram, San Ramon, CA (US); Brian Meaney, San Jose, CA (US); Mike Stern, San Francisco, CA (US); Paul T. Schneider, Chicago, IL (US); Eric J. Graves, Radnor, PA (US); Randy Ubillos, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 962 days.

(21) Appl. No.: 13/109,989

(22) Filed: May 17, 2011

(65) Prior Publication Data
US 2012/0210228 A1  Aug. 16, 2012

Related U.S. Application Data

(60) Provisional application No. 61/443,692, filed on Feb. 16, 2011.

(51) Int. Cl.
*G11B 27/00* (2006.01)
*G11B 27/034* (2006.01)
(Continued)

(52) U.S. Cl.
CPC .......... *G11B 27/005* (2013.01); *G11B 27/007* (2013.01); *G11B 27/034* (2013.01);
(Continued)

(58) Field of Classification Search
CPC ............. G06F 3/0484; G06F 17/30846; G06F 17/30781; G11B 27/005; G11B 27/007; G11B 27/034
(Continued)

(56) References Cited

U.S. PATENT DOCUMENTS 5,404,316 A   4/1995 Klingler et al.
5,440,348 A   8/1995 Peters et al.
(Continued)

FOREIGN PATENT DOCUMENTS

EP   0702832 A1   3/1996
GB   2464123 A    4/2010
(Continued)

OTHER PUBLICATIONS

Portions of prosecution history of U.S. Appl. No. 12/762,747, filed Jul. 6, 2010, Johnson, Gary.
(Continued)

*Primary Examiner* — Sherrod Keaton
(74) *Attorney, Agent, or Firm* — Invoke

(57) ABSTRACT

A novel method for retiming a portion of a media content (e.g., audio data, video data, audio and video data, etc.) in a media-editing application is provided. The media editing application includes a user interface for defining a range in order to select a portion of the media content. The media editing application performs retiming by applying a speed effect to the portion of the media content selected by the defined range. For a faster speed effect, the media editing application retimes the selected portion of the media content by sampling the media content at a faster rate. For a slower speed effect, the media editing application retimes the selected portion of the media content by sampling the content at a slower rate.

25 Claims, 20 Drawing Sheets

(51) Int. Cl.
*G11B 27/34* (2006.01)
*G06F 17/30* (2006.01)
*G06F 3/0484* (2013.01)

(52) U.S. Cl.
CPC ............ *G11B 27/34* (2013.01); *G06F 3/0484* (2013.01); *G06F 17/30781* (2013.01); *G06F 17/30846* (2013.01)

(58) Field of Classification Search
USPC .................................................. 715/719, 723
See application file for complete search history.

(56) References Cited

U.S. PATENT DOCUMENTS

| | | |
|---|---|---|
| 5,442,744 A | 8/1995 | Piech et al. |
| 5,453,846 A | 9/1995 | Tsao et al. |
| 5,467,288 A | 11/1995 | Fasciano et al. |
| 5,519,828 A | 5/1996 | Rayner |
| 5,521,841 A | 5/1996 | Arman et al. |
| 5,524,244 A | 6/1996 | Robinson et al. |
| 5,559,945 A | 9/1996 | Beaudet et al. |
| 5,613,909 A | 3/1997 | Stelovsky |
| 5,634,020 A | 5/1997 | Norton |
| 5,659,539 A | 8/1997 | Porter et al. |
| 5,659,792 A | 8/1997 | Walmsley |
| 5,659,793 A | 8/1997 | Escobar et al. |
| 5,664,216 A | 9/1997 | Blumenau |
| 5,682,326 A | 10/1997 | Klingler et al. |
| 5,732,184 A | 3/1998 | Chao et al. |
| 5,752,029 A | 5/1998 | Wissner |
| 5,760,767 A | 6/1998 | Shore et al. |
| 5,781,188 A | 7/1998 | Amiot et al. |
| 5,812,204 A | 9/1998 | Baker et al. |
| 5,826,102 A | 10/1998 | Escobar et al. |
| 5,838,381 A | 11/1998 | Kasahara et al. |
| 5,892,506 A | 4/1999 | Hermanson |
| 5,892,507 A | 4/1999 | Moorby et al. |
| 5,893,062 A | 4/1999 | Bhadkamkar et al. |
| 5,930,446 A | 7/1999 | Kanda |
| 5,940,573 A | 8/1999 | Beckwith |
| 5,999,173 A | 12/1999 | Ubillos |
| 5,999,220 A | 12/1999 | Washino |
| 6,005,621 A | 12/1999 | Linzer et al. |
| 6,057,833 A | 5/2000 | Heidmann et al. |
| 6,061,062 A | 5/2000 | Venolia |
| 6,122,411 A | 9/2000 | Shen et al. |
| 6,134,380 A | 10/2000 | Kushizaki |
| 6,144,375 A | 11/2000 | Jain et al. |
| 6,154,600 A | 11/2000 | Newman et al. |
| 6,154,601 A | 11/2000 | Yaegashi et al. |
| 6,161,115 A | 12/2000 | Ohanian |
| 6,172,675 B1 | 1/2001 | Ahmad et al. |
| 6,182,109 B1 | 1/2001 | Sharma et al. |
| 6,184,937 B1 | 2/2001 | Williams et al. |
| 6,188,396 B1 | 2/2001 | Boezeman et al. |
| 6,204,840 B1 | 3/2001 | Petelycky et al. |
| 6,211,869 B1 | 4/2001 | Loveman et al. |
| 6,229,850 B1 | 5/2001 | Linzer et al. |
| 6,243,133 B1 | 6/2001 | Spaulding et al. |
| 6,262,776 B1 | 7/2001 | Griffits |
| 6,281,420 B1 | 8/2001 | Suzuki et al. |
| 6,324,335 B1 | 11/2001 | Kanda |
| 6,366,296 B1 | 4/2002 | Boreczky et al. |
| 6,370,198 B1 | 4/2002 | Washino |
| 6,392,710 B1 | 5/2002 | Gonsalves et al. |
| 6,400,378 B1 | 6/2002 | Snook |
| 6,404,978 B1 | 6/2002 | Abe |
| 6,414,686 B1 | 7/2002 | Protheroe et al. |
| 6,469,711 B2 | 10/2002 | Foreman et al. |
| 6,476,826 B1 | 11/2002 | Plotkin et al. |
| 6,477,315 B1 | 11/2002 | Ohomori |
| 6,486,896 B1 | 11/2002 | Ubillos |
| 6,487,565 B1 | 11/2002 | Schechter et al. |
| 6,539,163 B1 | 3/2003 | Sheasby et al. |
| RE38,079 E | 4/2003 | Washino et al. |
| 6,542,692 B1 | 4/2003 | Housekeeper |
| 6,544,294 B1 | 4/2003 | Greenfield et al. |
| 6,546,188 B1 | 4/2003 | Ishii et al. |
| 6,546,399 B1 | 4/2003 | Reed et al. |
| 6,559,868 B2 | 5/2003 | Alexander et al. |
| 6,573,898 B1 | 6/2003 | Mathur et al. |
| 6,628,303 B1 | 9/2003 | Foreman et al. |
| 6,629,104 B1 | 9/2003 | Parulski et al. |
| 6,631,240 B1 | 10/2003 | Salesin et al. |
| 6,650,826 B1 | 11/2003 | Hatta |
| 6,658,194 B1 | 12/2003 | Omori |
| 6,665,343 B1 | 12/2003 | Jahanghir et al. |
| 6,674,955 B2 | 1/2004 | Matsui et al. |
| 6,714,216 B2 | 3/2004 | Abe |
| 6,741,996 B1 | 5/2004 | Brechner et al. |
| 6,744,968 B1 | 6/2004 | Imai et al. |
| 6,763,175 B1 | 7/2004 | Trottier et al. |
| 6,771,285 B1 | 8/2004 | McGrath et al. |
| 6,848,117 B1 | 1/2005 | Emura |
| 6,871,003 B1 | 3/2005 | Phillips et al. |
| 6,871,161 B2 | 3/2005 | Laird |
| 6,904,566 B2 | 6/2005 | Feller et al. |
| 6,928,613 B1 | 8/2005 | Ishii et al. |
| 6,940,518 B2 | 9/2005 | Minner et al. |
| 6,947,044 B1 | 9/2005 | Kulas |
| 6,950,836 B2 | 9/2005 | Lohn et al. |
| 6,956,574 B1 | 10/2005 | Cailloux et al. |
| 6,965,723 B1 | 11/2005 | Abe et al. |
| 6,967,599 B2 | 11/2005 | Choi et al. |
| 6,970,859 B1 | 11/2005 | Brechner et al. |
| 7,020,381 B1 | 3/2006 | Kato et al. |
| 7,035,435 B2 | 4/2006 | Li et al. |
| 7,035,463 B1 | 4/2006 | Monobe et al. |
| 7,042,489 B2 | 5/2006 | Zell et al. |
| 7,043,137 B2 | 5/2006 | Slone |
| 7,062,107 B1 | 6/2006 | Crosby et al. |
| 7,062,713 B2 | 6/2006 | Schriever et al. |
| 7,073,127 B2 * | 7/2006 | Zhao et al. .................. 715/719 |
| 7,079,144 B1 | 7/2006 | Shimada et al. |
| 7,103,260 B1 | 9/2006 | Hinson |
| 7,103,839 B1 | 9/2006 | Natkin et al. |
| 7,155,676 B2 | 12/2006 | Land et al. |
| 7,171,625 B1 | 1/2007 | Sacchi |
| 7,194,676 B2 | 3/2007 | Fayan et al. |
| 7,207,007 B2 | 4/2007 | Moriwake et al. |
| 7,313,755 B2 | 12/2007 | Rahman et al. |
| 7,325,199 B1 | 1/2008 | Reid |
| 7,336,264 B2 | 2/2008 | Cajolet et al. |
| 7,370,335 B1 | 5/2008 | White et al. |
| 7,383,509 B2 | 6/2008 | Foote et al. |
| 7,398,002 B2 | 7/2008 | Hsiao et al. |
| 7,411,590 B1 | 8/2008 | Boyd et al. |
| 7,432,940 B2 | 10/2008 | Brook et al. |
| 7,434,155 B2 | 10/2008 | Lee |
| 7,437,674 B2 | 10/2008 | Chen |
| 7,444,593 B1 | 10/2008 | Reid |
| 7,480,864 B2 | 1/2009 | Brook et al. |
| 7,502,139 B2 | 3/2009 | Nishimura |
| 7,518,611 B2 | 4/2009 | Boyd et al. |
| 7,539,659 B2 | 5/2009 | Wong et al. |
| 7,546,532 B1 | 6/2009 | Nichols et al. |
| 7,561,160 B2 | 7/2009 | Fukuya |
| 7,606,444 B1 | 10/2009 | Erol et al. |
| 7,623,755 B2 | 11/2009 | Kuspa |
| 7,623,756 B2 | 11/2009 | Komori et al. |
| 7,653,550 B2 | 1/2010 | Schulz |
| 7,664,336 B2 | 2/2010 | Zhang et al. |
| 7,668,869 B2 | 2/2010 | Weinberger et al. |
| 7,669,130 B2 | 2/2010 | Agarwal et al. |
| 7,689,510 B2 | 3/2010 | Lamkin et al. |
| 7,710,439 B2 | 5/2010 | Reid et al. |
| 7,720,349 B2 | 5/2010 | Ogikubo |
| 7,725,828 B1 | 5/2010 | Johnson |
| 7,739,299 B2 | 6/2010 | Kii et al. |
| RE41,493 E | 8/2010 | Marcus |
| 7,770,125 B1 | 8/2010 | Young et al. |
| 7,779,358 B1 | 8/2010 | Gupta et al. |
| 7,805,678 B1 | 9/2010 | Niles et al. |

(56) References Cited

U.S. PATENT DOCUMENTS

| | | |
|---|---|---|
| 7,823,056 B1 | 10/2010 | Davey et al. |
| 7,836,389 B2 | 11/2010 | Howard et al. |
| 7,856,424 B2 | 12/2010 | Cisler et al. |
| 7,885,472 B2 | 2/2011 | Yamamoto |
| 7,889,946 B1 | 2/2011 | Bourdev |
| 7,889,975 B2 | 2/2011 | Slone |
| 7,890,867 B1 | 2/2011 | Margulis |
| 7,925,669 B2 | 4/2011 | Freeborg et al. |
| 8,209,612 B2 | 6/2012 | Johnson |
| 2001/0000221 A1 | 4/2001 | Chen et al. |
| 2001/0020953 A1 | 9/2001 | Moriwake et al. |
| 2001/0033295 A1 | 10/2001 | Phillips |
| 2001/0036356 A1 | 11/2001 | Weaver et al. |
| 2001/0040592 A1 | 11/2001 | Foreman et al. |
| 2001/0056434 A1 | 12/2001 | Kaplan et al. |
| 2002/0018640 A1 | 2/2002 | Bolduc |
| 2002/0023103 A1 | 2/2002 | Gagne |
| 2002/0069218 A1 | 6/2002 | Sull et al. |
| 2002/0081099 A1 | 6/2002 | Tsumagari et al. |
| 2002/0089540 A1 | 7/2002 | Geier et al. |
| 2002/0101368 A1 | 8/2002 | Choi et al. |
| 2002/0122207 A1 | 9/2002 | Klassen et al. |
| 2002/0140719 A1 | 10/2002 | Amir et al. |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0168176 A1 | 11/2002 | Iizuka et al. |
| 2002/0188628 A1 | 12/2002 | Cooper et al. |
| 2003/0001848 A1 | 1/2003 | Doyle et al. |
| 2003/0002715 A1 | 1/2003 | Kowald |
| 2003/0002851 A1 | 1/2003 | Hsiao et al. |
| 2003/0007017 A1 | 1/2003 | Laffey et al. |
| 2003/0016254 A1 | 1/2003 | Abe |
| 2003/0018609 A1 | 1/2003 | Phillips et al. |
| 2003/0053685 A1 | 3/2003 | Lestideau |
| 2003/0088877 A1 | 5/2003 | Loveman et al. |
| 2003/0090504 A1 | 5/2003 | Brook et al. |
| 2003/0097400 A1 | 5/2003 | Li et al. |
| 2003/0117431 A1 | 6/2003 | Moriwake et al. |
| 2003/0146915 A1 | 8/2003 | Brook et al. |
| 2003/0164845 A1* | 9/2003 | Fayan ................ G11B 27/031 715/722 |
| 2003/0177145 A1 | 9/2003 | Lohn et al. |
| 2003/0197743 A1 | 10/2003 | Hill et al. |
| 2003/0234803 A1 | 12/2003 | Toyama et al. |
| 2004/0001079 A1 | 1/2004 | Zhao et al. |
| 2004/0001106 A1 | 1/2004 | Deutscher et al. |
| 2004/0001694 A1 | 1/2004 | Evans et al. |
| 2004/0012594 A1 | 1/2004 | Gauthier et al. |
| 2004/0027369 A1 | 2/2004 | Kellock et al. |
| 2004/0046804 A1 | 3/2004 | Chang |
| 2004/0056883 A1 | 3/2004 | Wierowski |
| 2004/0066395 A1 | 4/2004 | Foreman et al. |
| 2004/0071441 A1 | 4/2004 | Foreman et al. |
| 2004/0078761 A1 | 4/2004 | Ohanian |
| 2004/0085354 A1 | 5/2004 | Massand |
| 2004/0088723 A1 | 5/2004 | Ma et al. |
| 2004/0090462 A1 | 5/2004 | Graham |
| 2004/0098379 A1 | 5/2004 | Huang |
| 2004/0100482 A1 | 5/2004 | Cajolet et al. |
| 2004/0125124 A1 | 7/2004 | Kim et al. |
| 2004/0131330 A1 | 7/2004 | Wilkins et al. |
| 2004/0151469 A1 | 8/2004 | Engholm et al. |
| 2004/0197004 A1 | 10/2004 | Tagawa et al. |
| 2004/0201609 A1 | 10/2004 | Obrador |
| 2004/0212637 A1 | 10/2004 | Varghese |
| 2004/0215643 A1 | 10/2004 | Brechner et al. |
| 2004/0233806 A1 | 11/2004 | Kawahara |
| 2004/0257434 A1 | 12/2004 | Davis et al. |
| 2004/0267952 A1 | 12/2004 | He et al. |
| 2004/0268224 A1 | 12/2004 | Balkus et al. |
| 2005/0041029 A1 | 2/2005 | Felt |
| 2005/0042591 A1 | 2/2005 | Bloom et al. |
| 2005/0052441 A1 | 3/2005 | Stevens |
| 2005/0058430 A1 | 3/2005 | Nakamura et al. |
| 2005/0084232 A1 | 4/2005 | Herberger et al. |
| 2005/0120127 A1 | 6/2005 | Bradley et al. |
| 2005/0132293 A1 | 6/2005 | Herberger et al. |
| 2005/0183041 A1 | 8/2005 | Chiu et al. |
| 2005/0201724 A1 | 9/2005 | Chu |
| 2005/0207734 A1 | 9/2005 | Howell et al. |
| 2005/0213833 A1 | 9/2005 | Okada et al. |
| 2005/0216840 A1 | 9/2005 | Salvucci |
| 2005/0238217 A1 | 10/2005 | Enomoto et al. |
| 2005/0257152 A1 | 11/2005 | Shimizu et al. |
| 2006/0008247 A1 | 1/2006 | Minami et al. |
| 2006/0015811 A1 | 1/2006 | Tanaka et al. |
| 2006/0048057 A1 | 3/2006 | Herberger et al. |
| 2006/0056716 A1 | 3/2006 | Komeno |
| 2006/0059426 A1 | 3/2006 | Ogikubo |
| 2006/0078288 A1 | 4/2006 | Huang et al. |
| 2006/0101064 A1 | 5/2006 | Strong et al. |
| 2006/0112390 A1 | 5/2006 | Hamaoka |
| 2006/0136556 A1 | 6/2006 | Stevens et al. |
| 2006/0150072 A1 | 7/2006 | Salvucci |
| 2006/0155684 A1 | 7/2006 | Liu et al. |
| 2006/0156219 A1 | 7/2006 | Haot et al. |
| 2006/0161635 A1 | 7/2006 | Lamkin et al. |
| 2006/0161867 A1 | 7/2006 | Drucker et al. |
| 2006/0168521 A1 | 7/2006 | Shimizu et al. |
| 2006/0184980 A1 | 8/2006 | Cole |
| 2006/0224940 A1 | 10/2006 | Lee |
| 2006/0233514 A1 | 10/2006 | Weng et al. |
| 2006/0236245 A1 | 10/2006 | Agarwal et al. |
| 2006/0242122 A1 | 10/2006 | Devorchik et al. |
| 2006/0242164 A1 | 10/2006 | Evans et al. |
| 2006/0253781 A1 | 11/2006 | Pea et al. |
| 2006/0277454 A1 | 12/2006 | Chen |
| 2007/0016872 A1 | 1/2007 | Cummins et al. |
| 2007/0022159 A1 | 1/2007 | Zhu et al. |
| 2007/0053429 A1 | 3/2007 | Jawerth et al. |
| 2007/0058937 A1 | 3/2007 | Ando et al. |
| 2007/0061862 A1 | 3/2007 | Berger et al. |
| 2007/0079321 A1 | 4/2007 | Ott, IV |
| 2007/0124282 A1 | 5/2007 | Wittkotter |
| 2007/0136656 A1 | 6/2007 | Nydam et al. |
| 2007/0154190 A1 | 7/2007 | Gilley et al. |
| 2007/0168873 A1 | 7/2007 | Lentz |
| 2007/0189627 A1 | 8/2007 | Cohen et al. |
| 2007/0189708 A1 | 8/2007 | Lerman et al. |
| 2007/0192697 A1 | 8/2007 | Kawamura et al. |
| 2007/0192729 A1 | 8/2007 | Downs |
| 2007/0203945 A1 | 8/2007 | Louw |
| 2007/0204238 A1 | 8/2007 | Hua et al. |
| 2007/0234214 A1 | 10/2007 | Lovejoy et al. |
| 2007/0240072 A1 | 10/2007 | Cunningham et al. |
| 2007/0242085 A1 | 10/2007 | Weybrew et al. |
| 2007/0260968 A1 | 11/2007 | Howard et al. |
| 2007/0262995 A1 | 11/2007 | Tran |
| 2007/0266304 A1 | 11/2007 | Fletcher et al. |
| 2008/0013916 A1 | 1/2008 | Sharpe et al. |
| 2008/0034013 A1 | 2/2008 | Cisler et al. |
| 2008/0044155 A1 | 2/2008 | Kuspa |
| 2008/0062177 A1 | 3/2008 | Gaul et al. |
| 2008/0072166 A1 | 3/2008 | Reddy |
| 2008/0079972 A1 | 4/2008 | Goodwin et al. |
| 2008/0080721 A1 | 4/2008 | Reid et al. |
| 2008/0104127 A1 | 5/2008 | Billmaier et al. |
| 2008/0110553 A1 | 5/2008 | Otsubo |
| 2008/0120328 A1 | 5/2008 | Delgo et al. |
| 2008/0126191 A1 | 5/2008 | Schiavi |
| 2008/0138034 A1 | 6/2008 | Hiroi et al. |
| 2008/0152297 A1* | 6/2008 | Ubillos ................ G11B 27/034 386/333 |
| 2008/0152298 A1 | 6/2008 | Ubillos |
| 2008/0155420 A1 | 6/2008 | Ubillos et al. |
| 2008/0155421 A1 | 6/2008 | Ubillos et al. |
| 2008/0155459 A1 | 6/2008 | Ubillos |
| 2008/0170553 A1 | 7/2008 | Montemurro et al. |
| 2008/0172399 A1 | 7/2008 | Chi et al. |
| 2008/0184121 A1 | 7/2008 | Kulas |
| 2008/0184290 A1 | 7/2008 | Tapuska |
| 2008/0222170 A1 | 9/2008 | Farnham et al. |

(56) References Cited

U.S. PATENT DOCUMENTS

| | | |
|---|---|---|
| 2008/0253735 A1* | 10/2008 | Kuspa ................ G11B 27/005 386/343 |
| 2008/0256449 A1 | 10/2008 | Bhatt |
| 2008/0273862 A1 | 11/2008 | Okamoto et al. |
| 2008/0288869 A1 | 11/2008 | Ubillos |
| 2008/0306921 A1 | 12/2008 | Rothmuller et al. |
| 2008/0317431 A1 | 12/2008 | Mishima et al. |
| 2009/0006437 A1 | 1/2009 | Saito |
| 2009/0006475 A1 | 1/2009 | Udezue et al. |
| 2009/0031239 A1 | 1/2009 | Coleran et al. |
| 2009/0037605 A1 | 2/2009 | Li |
| 2009/0063429 A1 | 3/2009 | Rudolph |
| 2009/0070820 A1 | 3/2009 | Li |
| 2009/0089690 A1 | 4/2009 | Chi et al. |
| 2009/0097815 A1 | 4/2009 | Lahr et al. |
| 2009/0100339 A1 | 4/2009 | Wharton-Ali et al. |
| 2009/0129479 A1* | 5/2009 | Yellamraju ............... 375/240.24 |
| 2009/0147004 A1 | 6/2009 | Ramon et al. |
| 2009/0150947 A1 | 6/2009 | Soderstrom |
| 2009/0172543 A1 | 7/2009 | Cronin et al. |
| 2009/0174813 A1 | 7/2009 | Washino |
| 2009/0182644 A1 | 7/2009 | Panagopulos et al. |
| 2009/0187864 A1 | 7/2009 | Bedell et al. |
| 2009/0196346 A1 | 8/2009 | Zhang et al. |
| 2009/0201316 A1 | 8/2009 | Bhatt et al. |
| 2009/0204894 A1 | 8/2009 | Bhatt et al. |
| 2009/0232480 A1 | 9/2009 | Jendbro |
| 2009/0249185 A1 | 10/2009 | Datar et al. |
| 2009/0249222 A1 | 10/2009 | Schmidt et al. |
| 2009/0251475 A1 | 10/2009 | Mathur et al. |
| 2009/0254825 A1 | 10/2009 | Sichart et al. |
| 2009/0259623 A1 | 10/2009 | Mooneyham et al. |
| 2009/0263100 A1 | 10/2009 | Neuman |
| 2010/0005397 A1 | 1/2010 | Lanahan et al. |
| 2010/0005417 A1 | 1/2010 | Lanahan et al. |
| 2010/0005485 A1 | 1/2010 | Tian et al. |
| 2010/0021125 A1 | 1/2010 | Ingrosso et al. |
| 2010/0023972 A1 | 1/2010 | Summers et al. |
| 2010/0040349 A1* | 2/2010 | Landy ................ G11B 27/005 386/353 |
| 2010/0050080 A1 | 2/2010 | Libert et al. |
| 2010/0063961 A1 | 3/2010 | Guiheneuf et al. |
| 2010/0077289 A1 | 3/2010 | Das et al. |
| 2010/0080528 A1 | 4/2010 | Yen et al. |
| 2010/0082585 A1 | 4/2010 | Barsook et al. |
| 2010/0083173 A1 | 4/2010 | Germann et al. |
| 2010/0088295 A1 | 4/2010 | Duan et al. |
| 2010/0107126 A1 | 4/2010 | Lin et al. |
| 2010/0153395 A1 | 6/2010 | Hannuksela et al. |
| 2010/0153520 A1 | 6/2010 | Daun et al. |
| 2010/0158471 A1 | 6/2010 | Ogikubo |
| 2010/0194763 A1 | 8/2010 | Niles et al. |
| 2010/0241962 A1 | 9/2010 | Peterson et al. |
| 2010/0246996 A1 | 9/2010 | Yamamoto |
| 2010/0262710 A1 | 10/2010 | Khatib et al. |
| 2010/0274673 A1 | 10/2010 | Isaac |
| 2010/0274674 A1 | 10/2010 | Roberts et al. |
| 2010/0275121 A1* | 10/2010 | Johnson ............... G11B 27/005 715/719 |
| 2010/0275123 A1 | 10/2010 | Yu et al. |
| 2010/0278504 A1 | 11/2010 | Lyons et al. |
| 2010/0281366 A1 | 11/2010 | Langmacher et al. |
| 2010/0281367 A1 | 11/2010 | Langmacher et al. |
| 2010/0281371 A1 | 11/2010 | Warner et al. |
| 2010/0281377 A1 | 11/2010 | Meaney et al. |
| 2010/0281378 A1 | 11/2010 | Pendergast et al. |
| 2010/0281379 A1 | 11/2010 | Meaney et al. |
| 2010/0281381 A1 | 11/2010 | Meaney et al. |
| 2010/0281382 A1 | 11/2010 | Meaney et al. |
| 2010/0281383 A1 | 11/2010 | Meaney et al. |
| 2010/0281384 A1 | 11/2010 | Lyons et al. |
| 2010/0281386 A1 | 11/2010 | Lyons et al. |
| 2010/0287475 A1 | 11/2010 | Van et al. |
| 2010/0305729 A1 | 12/2010 | Glitsch et al. |
| 2010/0315366 A1 | 12/2010 | Lee et al. |
| 2010/0322981 A1 | 12/2010 | Bujard et al. |
| 2010/0332981 A1 | 12/2010 | Lipton et al. |
| 2011/0008017 A1 | 1/2011 | Gausereide |
| 2011/0010624 A1 | 1/2011 | Vanslette et al. |
| 2011/0026899 A1 | 2/2011 | Lussier et al. |
| 2011/0030031 A1 | 2/2011 | Lussier et al. |
| 2011/0047163 A1 | 2/2011 | Chechik et al. |
| 2011/0072037 A1 | 3/2011 | Lotzer |
| 2011/0097011 A1 | 4/2011 | Lim et al. |
| 2011/0103684 A1 | 5/2011 | Bhatt et al. |
| 2011/0103772 A1 | 5/2011 | Suzuki |
| 2011/0109796 A1 | 5/2011 | Subedar et al. |
| 2011/0113331 A1 | 5/2011 | Herberger et al. |
| 2012/0301114 A1 | 11/2012 | Johnson |
| 2014/0169765 A1 | 6/2014 | Wang et al. |

FOREIGN PATENT DOCUMENTS

| | | |
|---|---|---|
| WO | 94/29868 A2 | 12/1994 |
| WO | 99/14941 A2 | 3/1999 |
| WO | 2007/120694 A1 | 10/2007 |
| WO | 2008/151416 A1 | 12/2008 |
| WO | 2009/026159 A1 | 2/2009 |
| WO | 2009/114134 A2 | 9/2009 |
| WO | 2009/128227 A1 | 10/2009 |
| WO | 2009/129252 A2 | 10/2009 |
| WO | 2010/106586 | 9/2010 |

OTHER PUBLICATIONS

Portions of prosecution history of U.S. Appl. No. 10/686,990, filed Apr. 15, 2010, Johnson, Gary.

Author Unknown, "Apple Announces Final Cut Pro 4," NAB, Apr. 6, 2003, Apple Inc., Las Vegas, Nevada, USA.

Brenneis, Lisa, "Final Cut Pro 3 for Macintosh: Visual QuickPro Guide," Apr. 2002, Peachpit Press, Berkeley, California, USA.

Martin, Steve, "Final Cut Express System Requirements, OS 10.2 or Higher," Jan. 13, 2003, Ripple Training.

Sauer, Jeff, "Review: Apple Final Cut Pro 4," Oct. 3, 2003.

Stone, Ken, "Basic Keyframing in Final Cut Express", Jan. 27, 2003, V. 1.0.1, Ken Stone.

Stone, Ken, "Motion Paths and the Bezier Handle in FCP," Aug. 13, 2001, Ken Stone.

Author Unknown, "Using Adobe Premiere Elements 8 Editor," last updated Aug. 12, 2010, 313 pages, Adobe Systems Incorporated, San Jose, CA, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Updated portions of prosecution history of U.S. Appl. No. 12/762,747, filed May 25, 2012, Johnson, Gary.

Portions of prosecution history of U.S. Appl. No. 13/720,988, filed May 23, 2014, Wang, Xiaohaun C., et al.

Portions of prosecution history of U.S. Appl. No. 13/488,423, Johnson, Gary.

Work with Clips in Windows Movie Maker, by Microsoft. Internet Wayback archive Oct. 13, 2009.

Weynand, Diana. Apple Pro Training Series: Final Cut Pro for Avid Editors, Fourth Edition. 2010. Reviewed at Safaribooks Online.

Weingartner, Andy, "Windows Movie Maker 2011 User Guide," Month Unknown, 2011, pp. 1-42, Microsoft.

Wang, Yijin, et al. "MyVideos—A System for Home Video Management", Proceedings of the 10th ACM International Conference on Multimedia '02, Dec. 1-6, 2002, pp. 412-413, Juan-les-Pins, France.

Ulges, Adrian, et al., "Content-based Video Tagging for Online Video Portals", Proceedings of the 3rd MUSCLE/Image CLEF Workshop on Image and Video Retrieval Evaluation, Sep. 2007, 10 pages, Budapest, Hungary.

Shaw, Ryan, et al., "Toward Emergent Representations for Video", Proceedings of the 13th annual ACM International Conference on Multimedia, Nov. 6-11, 2005, 4 pages, Singapore.

(56) References Cited

OTHER PUBLICATIONS

Oetzmann, Anthony, et al., "Audacity—Editing for Beginners Part 2—Cut, Copy and Paste," Apr. 12, 2004, http://audacity.sourceforge.neUmanuall.2/tutorial_ed_beginner2.html.

Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.

Movie Maker by Microsoft, from Wayback Machine Jan. 28, 2010.

Long, A. Chris, et al., "Video Editing Using Lenses and Semantic Zooming", Human Computer Interaction Institute, Carnegie Mellon University, Month Unknown, 2009, pp. 1-11, Pittsburgh, PA.

Kutics, Andrea, et al., "Use of Adaptive Still Image Descriptors for Annotation of Video Frames", Lecture Notes in Computer Science, Month Unknown, 2007, pp. 686-697, vol. 4633, Springer-Verlaq, Berlin, Heidelberg.

Hwang, Hark-Chin, Soo Y. Chang, and Kangbok Lee. "Parallel machine scheduling under a grade of service provision." Computers & Operations Research 31, No. 12 (2004): 2055-2061.

Docuceur, et al. (Docuceur, J., Elson, J., Howell, J., and Lorch, J., "The Utility Coprocessor: Massively parallel computations from the coffee shop", in USENIX ATC (2010)).

Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesiqn.com/Documents/tn151-diakopoulos.pdf.

Chisan, James, et al., "Video Bench—Final Report: SEng 480a/CSc 586a," Apr. 11, 2003, pp. 1-43, University of Victoria, Canada.

Casares, Juan, et al., "Simplifying Video Editing Using Metadata", Processing of Designing Interactive Systems (DIS 2002), Jun. 2002, 10 pages, London, UK, available at http://www.informedia.cs.cmu.edu/documents/silver-dis02-draft.pdf.

Bolante, Anthony, "Premiere Pro CS3 for Windows and Macintosh: Visual QuickPro Guide", Dec. 4, 2007, 2 pages, Peachpit Press, USA.

Author Unknown, Apple Support Communities Discussions, "How to Change DV/DVCPRO video to 16:9 widescreen aspect ratio in Final Cut Pro X?", Jul. 2011; (https://discussions.apple.com/thread/3155532?start=0&tstart=0).

Author Unknown, "Work with clips in Windows Movie Maker," Oct. 13, 2009, 4 pages, Microsoft, USA.

Author Unknown, "Using Adobe Premiere Pro CS4", Apr. 24, 2009, 491 pages, Adobe Systems Incorporated, San Jose, California, USA.

Author Unknown, "Using Adobe Flash CS4 Professional," Updated Mar. 5, 2009, 470 pages, Adobe Systems Incorporated, San Jose, California, USA.

Author Unknown, "Frame-specific editing with snap—Premiere Pro CS4 Classroom in a Book," Dec. 17, 2008, 17 pages, Adobe Press, USA.

Author Unknown, "Avid Media Composer Editing Guide", Avid, Jun. 2010, 1688 pages, Burlington, MA, USA.

Author Unknown, "Adobe Premiere Pro CS4 Classroom in a Book", Dec. 17, 2008, 11 pages, Adobe Press, USA.

Author Unknown, "Adobe Premiere Pro CS3: Classroom in a Book", Month Unknown, 2008, 27 pages, Chapters 9 and 10, Adobe Systems Incorporated, San Jose, California, USA.

Author Unknown, "Adobe Premiere Elements 7: Arranging clips in the Sceneline," Dec. 11, 2008, 3 pages, http://help.adobe.com/en_US/PremiereElements/7.0/WSB04491 A8-859D-41e7-975F-0E26B9AECB9B.html.

Author Unknown, "Adobe Director 11: User Guide," Month Unknown, 2008, 498 pages, Adobe Systems Incorporated, San Jose, California, USA.

* cited by examiner

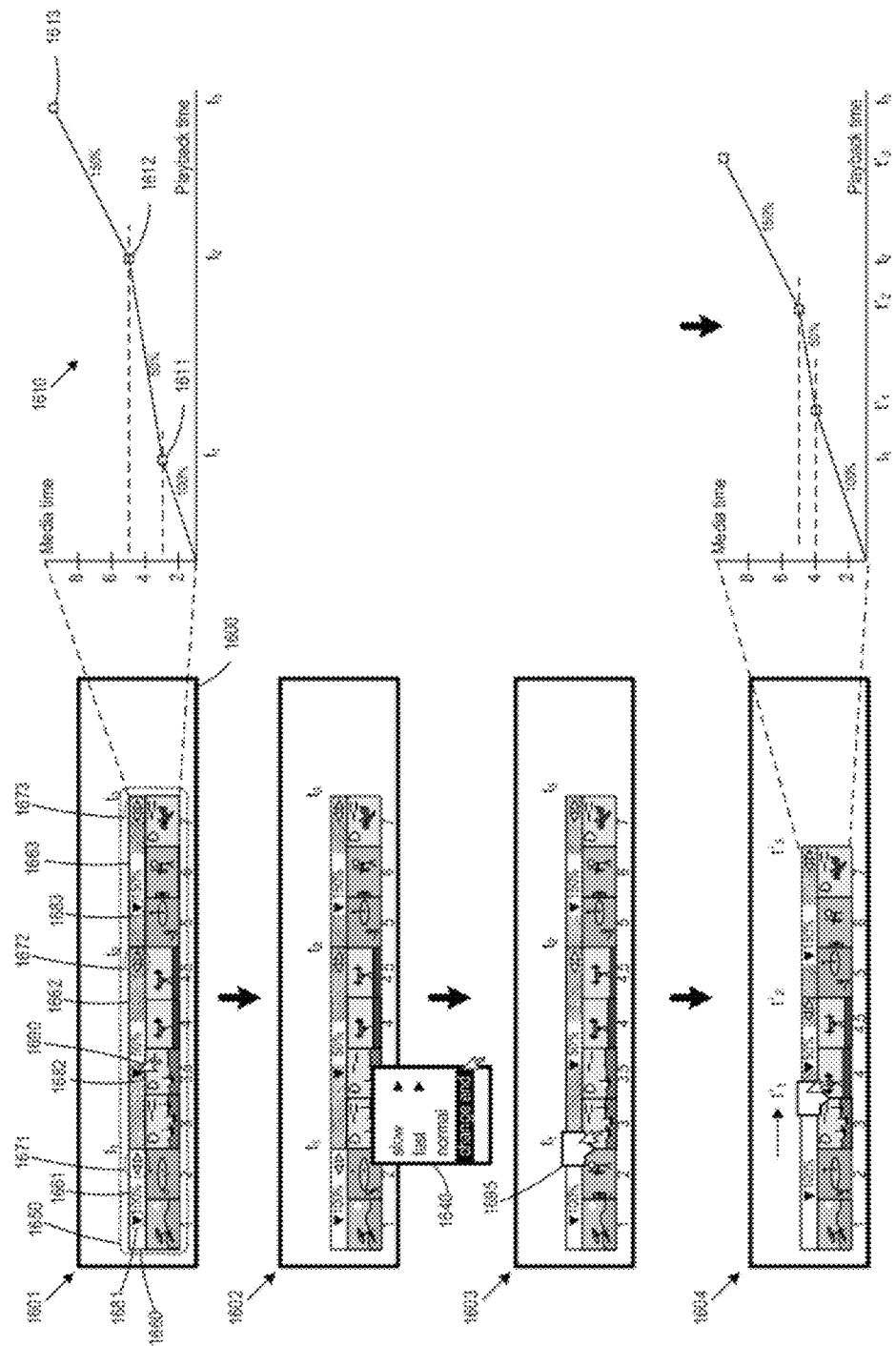

RETIMING MEDIA PRESENTATIONS

CLAIM OF BENEFIT TO PRIOR APPLICATIONS

The present application claims the benefit of U.S. Provisional Patent Application 61/443,692, entitled "Retiming Media Presentations," filed Feb. 16, 2011. The above-mentioned provisional application is incorporated herein by reference.

BACKGROUND

Digital graphic design, image editing, audio editing, and video editing applications (hereafter collectively referred to as media content editing applications or media editing applications) provide graphical designs, media artists, and other users with the necessary tools to create a variety of media content. Examples of such applications include Final Cut Pro® and iMovie®, both sold by Apple Inc. These applications give users the ability to edit, combine, transition, overlay and piece together different media content in a variety of manners to create a resulting media project. The resulting media project specifies a particular sequenced composition of any number of text, audio clips, images, or video content that is used to create a media presentation.

Various media editing applications facilitate such compositions through electronic means. Specifically, a computer or other electronic device with a processor and a computer readable storage medium executes the media content editing applications. In so doing, the computer generates a graphical interface whereby designers digitally manipulate graphical representation of the media content to produce a desired result.

One difficulty in media editing is that a user cannot easily and intuitively alter the timing of media clips in the graphical interface. For example, the user may wish to graphically specify that media content within a particular range to be played back at a particular playback speed (e.g., slow motion or accelerated motion). The user may also wish to apply other speed or timing effects (e.g., instant replay or rewind) to the particular range of media content.

Some existing media editing applications facilitate the application of speed or timing effect by providing a playback curve. A playback curve is an abstract representation of a media content that specifies the relationship between the media content and the playback time. A user can graphically manipulate the playback curve in order to adjust the playback timing of the media content. Unfortunately, such a timing adjustment is based on manipulations of an abstract representation of the media content that does not intuitively relate to the user what has happened to the media content. Worse yet, allowing direct user manipulation of the playback curve in some instances can cause unintended visual effects (such as playback speed overshoot).

BRIEF SUMMARY

Some embodiments of the invention provide a novel method for retiming a portion of a media content (e.g., audio data, video data, audio and video data, etc.) in a media-editing application. In some embodiments, the media editing application includes a user interface for defining a range in order to select a portion of the media content. The media editing application performs retiming by applying a speed effect to the portion of the media content selected by the defined range. For a faster speed effect, the media editing application retimes the selected portion of the media content by sampling the media content at a faster rate. For a slower speed effect, the media editing application retimes the selected portion of the media content by sampling the content at a slower rate.

The media-editing application of some embodiments provides preset speed effects so a user can quickly achieve an initial retiming effect on a selected range in the composite presentation. The initial retiming effect can then be used as a template for further adjustment and refinement by the user for desired result.

In order to perform retiming operations, some embodiments of the media editing application maintain a playback curve for adjusting the playback speed of the composite presentation. The playback curve is for mapping each video frame that needs to be played back at a particular instant in time to one or more video frames in the source media clips. In some embodiments, the same playback curve is also used to map audio playback such that the slope of the playback curve at a particular instant in time corresponds to the audio playback speed at that particular instant in time.

Each retiming operation is implemented based on adjustments of the playback curve. In some embodiments, the playback curve is entirely controlled and maintained by the media editing application and cannot be directly manipulated by the user. After a retiming operation, some embodiments perform a curve smoothing operation that avoids overshooting and maintains monotonicity between keyframes.

Some embodiments of the media editing application supports anchored clips that are anchored to a particular video frame during playback. Some embodiments ensure that the anchored clip remains anchored to the correct video frame after the retiming operation. Some of these embodiments map the anchored frame to an anchor media time $T_A$, and then use the anchor media time $T_A$ to map to the correct new playback time after the retiming operation. Some embodiments map the anchor media time $T_A$ to a unique anchor playback time for the anchored clip by marking a section of the playback curve defined by two keyframes as being associated with the anchored clip.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 16 illustrates an example range adjustment operation of a media clip that has been partitioned by an earlier preset retiming operation.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method for retiming a portion of a media content (e.g., audio data, video data, audio and video data, etc.) in a media-editing application. In some embodiments, the media editing application includes a user interface for defining a range in order to select the portion of the media content. The media editing application then performs retiming by applying a speed effect to the portion of the media content selected by the defined range. For a faster speed effect, the media editing application retimes the selected portion of the media content by sampling the media content at a faster rate. For a slower speed effect, the media editing application retimes the selected portion of the media content by sampling the content at a slower rate.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a media clip sequence), a text clip, a text overlay, a still image or picture, or any other type of media clip that can be used to create a composite presentation. In this application, a media clip may also refer to the graphical representation of the media clip in the GUI of a media-editing application of some embodiments.

Figure 1:
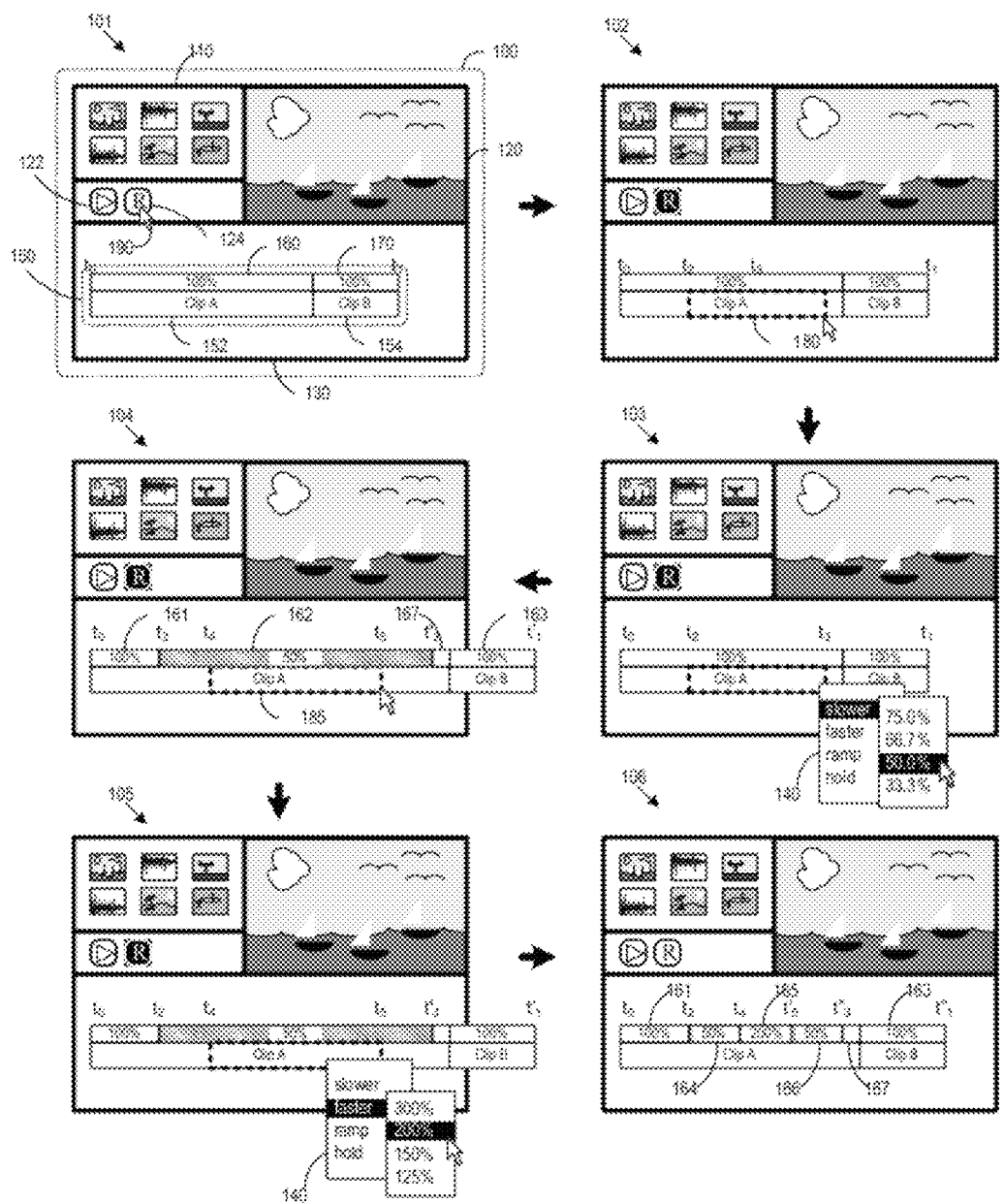
FIG. 1 illustrates an example of a media editing application that performs retiming operation on portions of a media clip.

For some embodiments, FIG. 1 illustrates an example of a media editing application that performs retiming operation on portions of a media clip. FIG. 1 illustrates the retiming operation in six different stages 101-106 of a graphical user interface (GUI) 100 of the media editing application. As shown in this figure, the GUI 100 includes a media library area 110, a preview display area 120, a timeline 130, an effects menu 140, a playback activation item 122 and a retiming tool activation item 124. In some embodiments, the GUI 100 also includes a user interaction indicator such as a cursor 190.

The media library 110 is an area in the GUI 100 through which the application's user can select media clips (video or audio) to add to a media presentation that the user is compositing with the application. In the example of FIG. 1, the clips in the media library 110 are presented as thumbnails that can be selected and added to the timeline 130 (e.g., through a drag-and-drop operation or a menu selection operation). The clips in the media library may also be presented as a list, a set of icons, or some other visual representations that allows a user to view and select the various clips in the library. In some embodiments, the media library 110 may include audio clips, video clips, text overlays, pictures, and/or other media. The preview display area 120 provides a preview of the actual playback of the composite presentation.

The timeline 130 provides a visual representation of a composite presentation being created by the user. In some embodiments, a composite presentation in the timeline 130 includes one or more containers of media clips. Media clips such as video and/or audio clips can be brought into one of the containers in the timeline 130 from the media library 120 for creating the composite presentation.

The timeline 130 includes a central compositing lane 150 that includes clips 152 (clip A) and 154 (clip B). The inclusion of clips A and B are graphically indicated by graphical representation of the clips in the central compositing lane 150. A clip can contain a single piece of media content from a single source. A clip can also be a compound clip that includes several pieces of media content from multiple sources. A clip in the timeline is therefore referred to as a media container in some embodiments. A central compositing lane in some embodiments is the main track of the composite presentation, upon which other video clips and audio clips can be overlaid. In some embodiments, the timeline 130 has only one track and the central compositing lane 150 is that only track of the timeline. In some other embodiments, the timeline has multiple tracks and the central compositing lane 150 is one of the tracks.

Clip 152 includes an effect bar 160 that indicates the status of an effect being applied to the clip A. Clip 154 includes an effect bar 170 that indicates the status of an effect being applied to clip B. In the example of FIG. 1, the effect bars 160 and 170 indicate the playback speeds of the clips 152 and 154. In some embodiments, clips in the central compositing lane can include one or more additional effect bars for indicating the status of other effects being applied. An effect bar can also be broken into multiple sections or portions to indicate the status of effects being applied to different sections or portions of a clip.

The effects menu 140 provides a menu of effects that can be selected and applied to the composite presentation. One of ordinary skill in the art would recognize that the effects menu can be implemented in the GUI 100 as a fixed panel or as a pop menu that appears only when specifically invoked by the user (e.g., by a mouse click or a selection of a particular GUI item). The effects menu 140 includes speed effects such as "slower", "faster", "ramp" and "hold", which are described in more detail further below. In some embodiments, the effects menu 140 also includes other speed effects such as "instant replay", "rewind", and "conform speed" ", which are described in more detail further below. In addition to speed effects that affect the playback time of the composite presentation, the effects menu in some embodiments also includes one or more other visual or audio effects that do not affect the playback time of the composite presentation. In some embodiments, the effects in the effects menu 140 are "preset" effects. A preset effect is an effect that, once selected by the user, is automatically applied to a range of media contents. A user can then use the GUI to further manipulate the resultant composite presentation and adjust the applied speed effect.

In some embodiments, operations of the media editing application that changes the timing relationship between playback and content (such as applying a preset speed effects or adjusting a previously applied speed effects) are performed by a retiming engine of the media editing application. In some embodiments, the media editing application translates selection of preset speed effect and/or user adjustment of speed effect of a media clip into one or more retiming commands for the retiming engine, which generates, maintains, and adjusts a playback curve for the media clips according to the retiming command. Retiming engine or retiming module will be further described by reference to FIG. 21 below.

The playback activation item 122 is a conceptual illustration of one or more UI items that allow the media editing application to activate its video and audio playback. The retiming tool activation item 124 is a conceptual illustration of one or more UI items that allow the media editing application to activate its retiming tool. Different embodiments of the invention implement these UI items differently. Some embodiments implement them as a selectable UI button, others as a command that can be selected in a pull-down or drop-down menu, and still others as a command that can be selected through one or more keystroke operations. Accordingly, the selection of the playback activation item 122 and retiming tool activation item 124 may be received from a cursor controller (e.g., a mouse, touchpad, trackball, etc.), from a touchscreen (e.g., a user touching a UI item on a touchscreen), or from a keyboard input (e.g., a hotkey or a key sequence), etc. Yet other embodiments allow the user to access the retiming tool feature through two or more of such UI implementations or other UI implementations.

In order to perform retiming operations, some embodiments of the media editing application maintain a playback curve for adjusting the playback speed of the composite presentation. The playback curve is for mapping each video frame that needs to be played back at a particular instant in time to one or more video frame in the source media clips. In some embodiments, the same playback curve is also used to map audio playback such that the slope of the playback curve at a particular instant in time corresponds to the audio playback speed at that particular instant in time. Each retiming operation is implemented based on adjustments of the playback curve. In some embodiments, the playback curve is entirely controlled and maintained by the media editing application and cannot be directly manipulated by the user.

Figure 2:
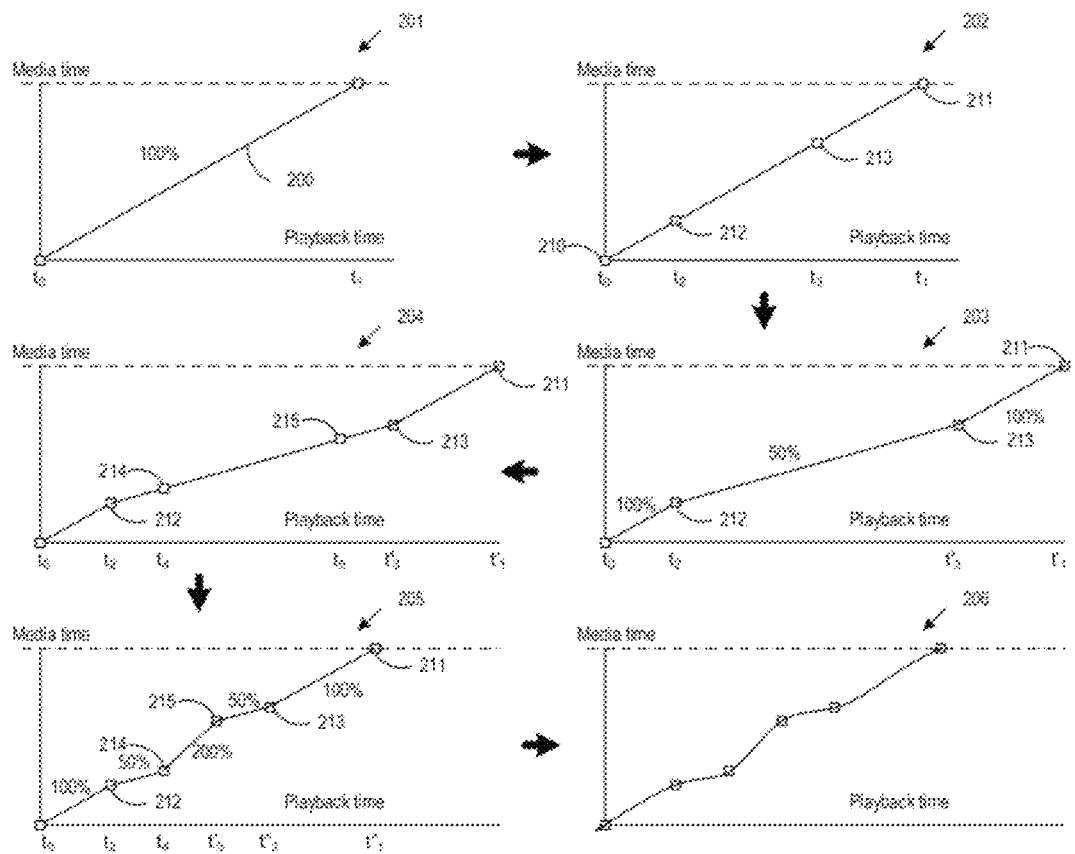
FIG. 2 illustrates a playback curve at different stages of the retiming operations described in FIG. 1.

The six stages 101-106 of the retiming operation of FIG. 1 will now be described by reference to FIG. 2. FIG. 2 illustrates a playback curve 200 at six different stages 201-206 of the retiming operations described in FIG. 1. The playback curve 200 has playback time as its x-axis and media time as its y-axis. Media time is the time native to a piece of media content. In some embodiments, an instant in the media time associated with a video frame specifies the time that the video frame is captured or intended to be displayed. The dashed line 210 marks the end of the media content and hence the end of media time. Playback time is the time that the piece of media content is actually being played back as part of the composite presentation. As such, each point in the playback curve 200 maps a particular instant in playback time with a particular instant in media time. The slope of the playback curve at any particular instant in playback time indicates the playback speed at that particular instant. A slope of 100% in a playback curve indicates that the playback time is elapsing at the same rate as the media time, or that the playback speed is the same as the normal speed of the media content. FIG. 2 also illustrates the keyframes 210-214 along the playback curve. The keyframes 210-214 are points along the playback curve 200 that defines a transition in the playback of the central compositing lane 150.

The first stage 101 of FIG. 1 shows the GUI 100 before the retiming operation. The cursor 190 is placed over the retiming activation item 124 in order to activate the retiming tool. At the stage 101, the effect bar 160 has only one section, indicating that the playback speed of the clip A is at 100% of the normal speed. The stage 201 of FIG. 2 corresponds to the stage 101 and illustrates the playback curve 200 before the retiming operation. The playback curve is a straight line at a slope that corresponds to a playback speed at 100% of the normal speed. The corresponding period for the two clips in the central compositing lane 150 starts at playback time t0 and ends at playback time t1, which corresponds to the start and end of the media time according to the playback curve 200.

The second stage 102 of FIG. 1 shows the selection of a range for selecting a portion of the central compositing lane from t2 to t3. In some embodiments, the user is able to graphically define the range (e.g., by clicking and dragging on the range indicator 180) after the selection of the retiming activation item 124. Some embodiments also allow the user to determine the range textually by directly inputting numerical values for defining the start and end of the selection range. The selection of the range 180 corresponds to stage 202 of FIG. 2. At stage 202, keyframes 212 and 213 are inserted at t2 and t3 to mark the start and end time of the selection range 180 on the playback curve 200. In some embodiments, range selection is performed by a range selector module that is part of a UI interaction module that handles user inputs for the media editing application. In this example, the range selector module receives user definition of the range (i.e., from the retiming activation item 124 and from the click and drag operation) and translates this range definition into commands for the retiming engine.

The third stage 103 of FIG. 1 shows the selection of a preset effect to be applied to the portion of the central compositing lane 150 within the selected range 180. Specifically, the cursor 190 is used to select from the effects menu 140 a "slower" speed effect that slows the playback speed down to 50% of the normal playback speed. The sub-menu of the effects menu 140 displays playback speed options 75%, 66.7%, 50% and 33.3%. One of ordinary skill in the art would recognize that the "slower" speed effect preset can have other playback speed options. For example, the "slower" speed effect preset includes playback speed options 50%, 25% and 10% in some embodiments.

The fourth stage 104 of FIG. 1 shows the result of the application of the "slower" speed effect. The effect bar 160 of clip A is now partitioned into four sections 161, 162, 163 and 167, each section of the effect bar specifies a playback speed for a portion of the clip 152 that falls under the section. The first section 161 specifies that the portion of the clip 152 from t0 to t2 is to be played back at 100% of the normal speed. The second section 162 specifies that the portion of the clip 152 from t2 to t'3 is to be played back at 50% of the normal speed. The third section 163 specifies that the portion of the central compositing lane from t'3 to t'1 is to be played back at 100% of the normal speed. The fourth section remain at 100% playback speed.

The second section 162 corresponds to the selected range 180 after the application of the "slower" preset speed effect. The duration of second section 162 (t'3-t2) is longer than the duration of the selected range 180 (t3-t2) because the portion of the second section 162 is being played back at 50% of the normal speed (thus the duration of the section is twice as long as before the speed effect). The section 162 of the effects bar is also marked with a visual indication (i.e., diagonal hash pattern) to indicate that this section is to be played back at a speed slower than normal. In some embodiments, each section of the effects bar is associated with a visual indication of the effect being applied. For example, some embodiments color code each section of the effect bar according to the speed of the playback (e.g., green for normal speed, orange for speed slower than normal, blue for speed faster than normal, and red for stoppage or pause during playback.) Some of these embodiments use different color intensity levels to indicate different levels of speed. Some embodiments use different patterns and or different texts on the effect bar to provide visual indications of effects being applied.

The application of the "slower" speed effect corresponds to stage 204 of FIG. 2. At stage 204, keyframes 213 and 211 have both shifted to the right (from t3 and t1 to t'3 and t'1) because of the longer duration of the second section 162. The longer duration of the second section 162 also results in a slower playback speed (50%) between t2 and t'3, as the same duration of media time is being stretched out for longer playback time.

The fourth stage 104 of FIG. 1 also illustrates the selection of a second range 185 by the cursor 190. The second range 185 starts at playback time t4 and ends at playback time t5. The selection of the range 185 corresponds to the stage 204 of FIG. 2, in which additional keyframes 214 and 215 are defined along the playback curve at the playback time t4 and t5.

The fifth stage 105 of FIG. 1 shows the selection of another effect preset from the effects menu 140. Specifically, the "faster" speed effect is selected to accelerate the playback speed within the range 185 to 200% of the normal speed. The sub-menu of the effects menu 140 displays playback speed options 125%, 150%, 200% and 300%. One of ordinary skill in the art would recognize that the "faster" speed effect preset can have other playback speed options. For example, the "faster" speed effect preset includes playback speed options 200%, 400%, 800% and 2000% in some embodiments.

The last stage 106 of FIG. 1 illustrates the result of the "faster" speed effect on the composite presentation and the central compositing lane 150. The effects bar 160 is now partitioned into six sections 161, 163, 164, 165, 166 and 167. The section 161 remains unchanged because it falls outside of the selected range 185. The section 163 also falls outside the selected range, but has shifted to the left (from t'3 to t''3). What was once section 162 with playback speed 50% is partitioned into sections 164-166 by the selected range 185. The section 165 corresponds to the selected range 185, and its duration has been shrunk because its playback speed has been accelerated to 200% of normal speed. The selected range starts at t4, which created the new section 164 before it which starts at t2 and ends at t4 with playback speed of 50%. The selected range ends at t5, which after the "faster" speed effect has shifted to t'5 to mark the start of the new section 166 with playback speed of 50%.

The application of the "faster" speed effect corresponds to stage 205 of FIG. 2. At stage 205, keyframes 215, 213 and 211 have all shifted to the left (from t5, t'3 and t'1 to t'5, t''3 and t''1), corresponding to the shorter duration of the section 165. The shorter duration of the section 165 also corresponds to a faster playback speed (200%) between t4 and t'5, as the same duration of media time is being compressed for shorter playback time.

In some embodiments, the media application performs a curve smoothing operation after a retiming operation. As illustrated in FIG. 2, every application of speed effect that changes playback speed on a portion of the central compositing lane results in discontinuity in playback speed. Specifically, the "slower" and "faster" retiming operations have created discontinuity in playback speed from 100% to 50% (at t2), from 50% to 200% (at t4), from 200% to 50% (at t'5), and from 50% to 100% (at t''3). Such speed discontinuity can be visually distracting to a viewer. Some embodiments thus adjust the playback curve in order to ameliorate the playback speed discontinuity. Stage 206 of FIG. 2 illustrates the curve smoothing operation on the playback curve 200 after the retiming operation of FIG. 1. As illustrated, the curve smoothing operation has adjusted the playback curve 200 near the discontinuities such that the slope or tangent (i.e., playback speed) of the smoothed playback curve is continuous throughout the curve. In some embodiments, the curve smoothing operation is entirely handled by the media editing application and it is not visible to the user nor is it accessible by the user. The media editing application in some of these embodiments choose curve smoothing settings that would avoid overshooting in the smoothed curve by maintaining monotonicity between keyframes (i.e., the curve is always increasing or decreasing between two adjacent keyframes.) Curve smoothing operation will be further described below in Section III-B.

In some embodiments, media clips do not necessarily start at time 0 (e.g., a media clip can start at 1 minute after time 0). In these instances, the retiming operations that change playback speeds of specific sections (such as the "faster" and "slower" speed effect presets discussed above) perform the retiming operation by pivoting on time 0 rather than the actual start time of the media clip. For example, if a media clip starts at 5 s and ends at 15 s, a retiming operation that slows the entire media clip to 50% playback speed would change the start time of the media clip to 10 s and the end time to 30 s (instead of leaving the start time at 5 s and changing the end time to 25 s.)

Figure 3:
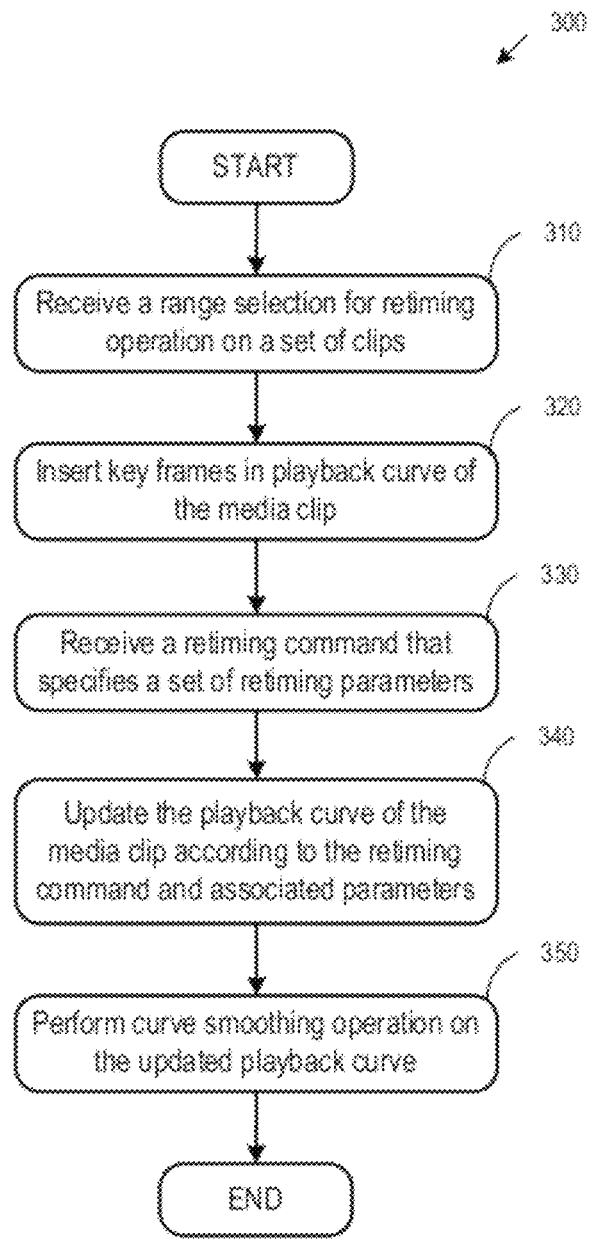
FIG. 3 conceptually illustrates a process for performing a retiming operation.

For some embodiments, FIG. 3 conceptually illustrates a process 300 for performing a retiming operation. The process 300 will be described by reference to FIGS. 1 and 2. The process 300 starts after the user has activated retiming operation, such as by selecting the retiming tool activation item 124 in the GUI 100 of FIG. 1. The process receives (at 310) a range selection (such as the range 180 in FIG. 1) for the retiming operation on a set of media clips. Next, the process 300 inserts (at 320) one or more keyframes in the playback curve associated with the clip or a set of clips according to the selected range. In some embodiments, such keyframes are inserted at locations that correspond to the start and end points of the selected range such as keyframes 212 and 213 in the stage 202 of FIG. 2.

The process 300 next receives (at 330) a retiming command that specifies a set of retiming parameters. In the example of FIG. 1, such retiming command is received after the user uses the effects menu 140 to select one of the preset retiming operations (such as "slower" and "faster").

Next, the process updates (at 340) the playback curve of the clip or set of clips in the media clip according to the retiming command and associated parameters. In the example of FIG. 1, the playback curve 200 is updated according to the retiming preset commands by moving the inserted keyframes along the curve in order to create the speed effect specified by the retiming commands.

The process next performs (at 350) curve-smoothing operation on the updated playback curve. The curve-smoothing operations make changes to the curve to minimize or eliminate playback speed discontinuities. After performing the curve smoothing operation, the process 300 ends.

Figure 4:
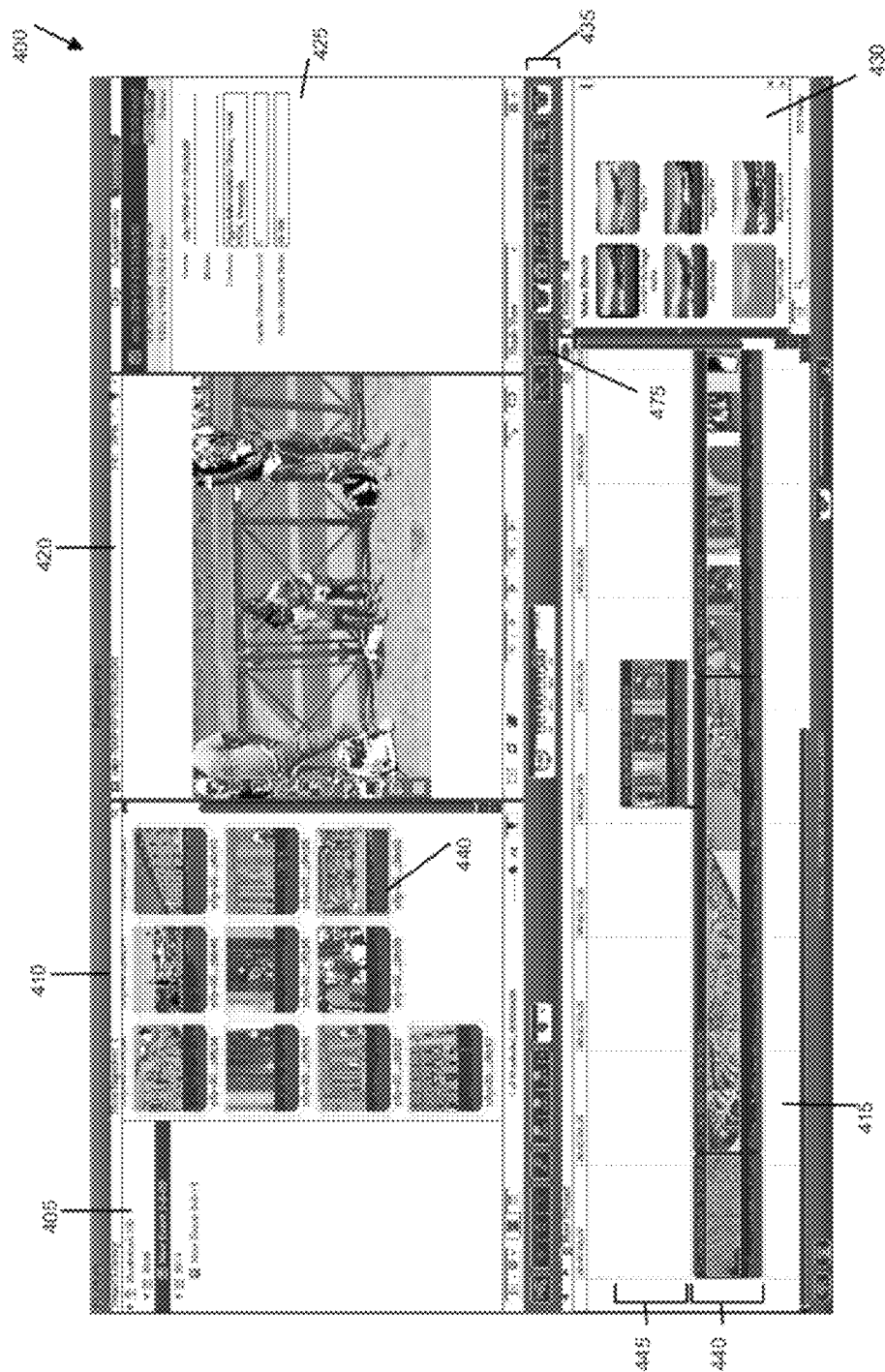
FIG. 4 illustrates an example graphical user interface ("GUI") 400 of a media-editing application.

A more detailed view of a media editing application with these features is illustrated in FIG. 4. FIG. 4 illustrates a graphical user interface (GUI) 400 of a media-editing application of some embodiments. One of ordinary skill will recognize that the graphical user interface 400 is only one of many possible GUIs for such a media-editing application. In fact, the GUI 400 includes several display areas which may be adjusted in size, opened or closed, replaced with other display areas, etc. The GUI 400 includes a clip library 405, a clip browser 410, a timeline 415, a preview display area 420, an inspector display area 425, an additional media display area 430, and a toolbar 435.

The clip library 405 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 405 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 405 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the wedding event that filters clips in this event to only display media clips tagged with the "kids" keyword.

The clip browser 410 allows the user to view clips from a selected folder (e.g., an event, a sub-folder, etc.) of the clip library 405. As shown in this example, the folder "New Event 2-8-11 3" is selected in the clip library 405, and the clips belonging to that folder are displayed in the clip browser 410. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 415 provides a visual representation of a composite presentation (or project) being created by the user of the media-editing application. Specifically, it displays one or more geometric shapes that represent one or more media clips that are part of the composite presentation. The timeline 415 of some embodiments includes a primary lane 440 (also called a "spine", "primary compositing lane", or "central compositing lane") as well as one or more secondary lanes 445 (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 410 into the timeline 415 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 420.

The preview display area 420 (also referred to as a "viewer" displays images from media files that the user is skimming through, playing back, or editing. These images may be from a composite presentation in the timeline 415 or from a media clip in the clip browser 410. In this example, the user has been skimming through the beginning of clip 440, and therefore an image from the start of this media file is displayed in the preview display area 420. As shown, some embodiments will display the images as large as possible within the display area while maintaining the aspect ratio of the image.

The inspector display area 425 displays detailed properties about a selected item and allows a user to modify some or all of these properties. The selected item might be a clip, a composite presentation, an effect, etc. In this case, the clip that is shown in the preview display area 420 is also selected, and thus the inspector displays information about media clip 440. This information includes duration, file format, file location, frame rate, date created, audio information, etc. about the selected media clip. In some embodiments, different information is displayed depending on the type of item selected.

The additional media display area 430 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 430 is currently displaying a set of effects for the user to apply to a clip. In this example, only two effects are shown in the display area (the keyer effect and the luma keyer effect, because the user has typed the word "keyer" into a search box for the effects display area).

The toolbar 435 includes various selectable items for editing, modifying what is displayed in one or more display areas, etc. The right side of the toolbar includes various selectable items for modifying what type of media is displayed in the additional media display area 430. The illustrated toolbar 435 includes items for video effects, visual transitions between media clips, photos, titles, generators and backgrounds, etc. In addition, the toolbar 435 includes an inspector selectable item that causes the display of the inspector display area 425 as well as items for applying a retiming operation to a portion of the timeline, adjusting color, and other functions. In some embodiments, selecting the retiming tool activation item 475 invokes a speed effects menu that includes one or more selectable retiming operation presets.

The left side of the toolbar 435 includes selectable items for media management and editing. Selectable items are provided for adding clips from the clip browser 410 to the timeline 415. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 400 is one of many possible configurations for the GUI of some embodiments. For instance, in some embodiments, the presence or absence of many of the display areas can be toggled through the GUI (e.g., the inspector display area 425, additional media display area 430, and clip library 405). In addition, some embodiments allow the user to modify the size of the various display areas within the UI. For instance, when the additional media display area 430 is removed, the timeline 415 can increase in size to include that area. Similarly, the preview display area 420 increases in size when the inspector display area 425 is removed.

Several more detailed embodiments of the invention are described below. Section I describes other retiming operations performed by other speed effect presets. Section II describes retiming operations performed by user manipulations. Section III describes in further detail the mapping of playback time using the playback curve. Section IV describes the interaction between retiming operations and anchor clips. Section V describes a media editing application that performs retiming. Finally, Section VI describes an electronic system with which some embodiments of the invention are implemented.

I. Speed Effect Presets

In some embodiments, the media editing application provides preset speed effects so a user can quickly achieve an initial retiming effect on a selected range in the composite presentation. The initial retiming effect can then be used as a template for further adjustments and refinements by the user for desired result. FIG. 1 above illustrates two such preset speed effect, namely "slower" and "faster" playback speed for a selected range. In addition to playing a portion of a media clip faster or slower, the media editing application in some embodiments also supports other speed effect or retiming operations. FIGS. 5-13 below illustrate the operation of several such speed effects such as "ramp", "hold", "instant replay", "rewind" and "conform speed".

Figure 5:
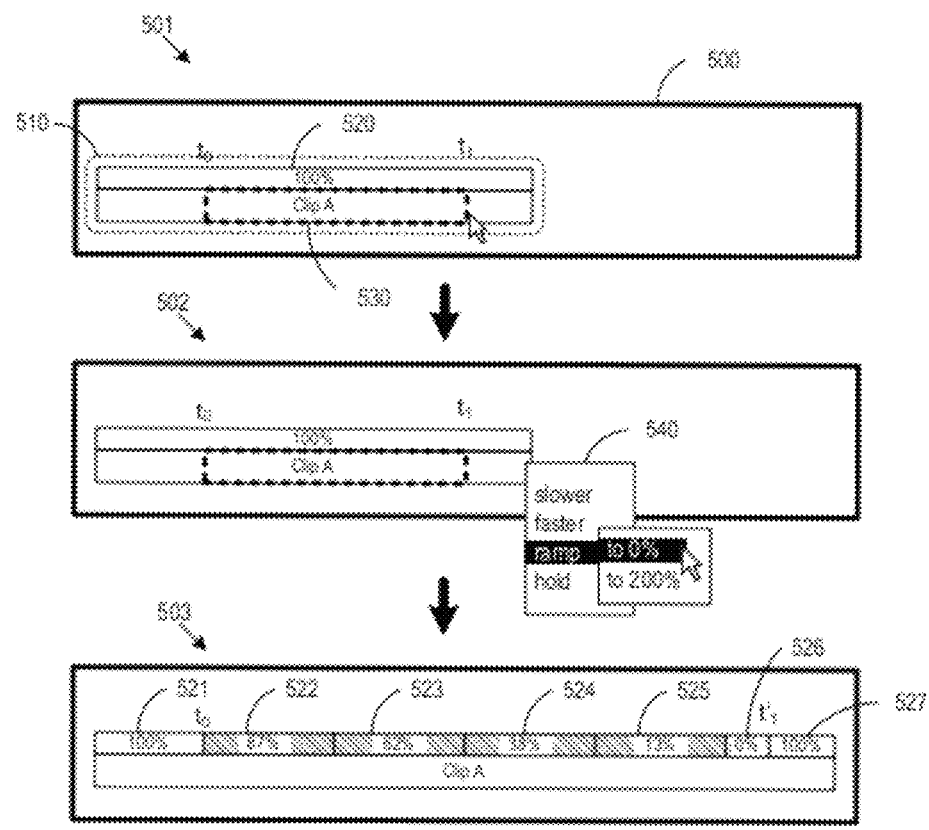
FIG. 5 illustrates an example ramp retiming operation in a timeline.

A "ramp" operation is a retiming operation that automatically divides a selected range of a clip or a set of clips in a media clip of a timeline into multiple sections of increasing or decreasing playback speed. For some embodiments, FIG. 5 illustrates an example ramp retiming operation in a timeline 500 that is similar to the timeline 130 of the GUI 100 in FIG. 1. The timeline 500 includes a media clip 510 (clip A) that has an effects bar 520.

FIG. 5 illustrates the ramp retiming operation in three stages 501-503. The first stage 501 of FIG. 5 shows the selection of a range of media content. A cursor 590 is used to graphically select a range 530 of media content in the media clip 510 from playback time t0 to playback time t1.

The second stage 502 illustrates the selection of a ramp retiming operation from an effects menu 540. Specifically, the selection specifies that the ramp operation gradually decreases the speed of the selected range 530 toward 0% of normal playback speed. The effects menu 540 also includes other options for the ramp retiming operation. For example, the user can select to gradually increase playback speed toward 200% of normal playback speed.

The third stage 503 illustrates the result of the ramp retiming operation. The effects bar 520 and the media clip 510 have been partitioned into seven different sections 521-527. Sections 521 and 527 correspond to portions of the media clip 510 that falls outside of the range 530 and thus remain at 100% of normal playback speed. Section 527 starts at a playback time t'1 instead of t1 because the selected ramp retiming operation slows down playback speed and increases playback time. Sections 522-526 are assigned playback speed at 87%, 62%, 38%, 13% and 0% respectively. To complete the speed ramp toward 0%, some embodiments include the 0% playback speed section 526. In some of these embodiments, the 0% playback speed portion of the speed ramp is shorter than other sections (522-525) in the ramp.

One of ordinary skill in the art would recognize that many different possible implementations of the ramp retiming operation is possible than what is illustrated in FIG. 5. For example, instead of having five speed ramp sections, the media editing application can provides six or more speed ramp sections.

Figure 6:
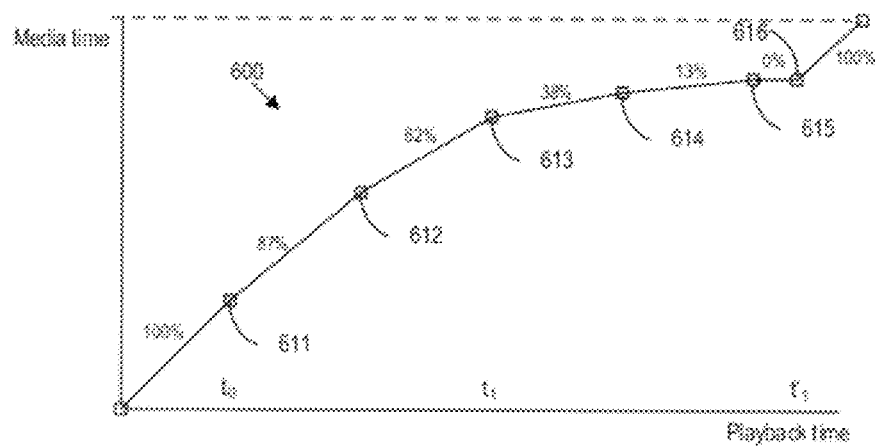
FIG. 6 illustrates a playback curve that is maintained by the media editing application while performing the ramp retiming operation of FIG. 5.

FIG. 6 illustrates a playback curve 600 that is maintained by the media editing application while performing the ramp retiming operation of FIG. 5. As illustrated, the playback curve 600 is partitioned into sections of different playback speed (i.e., different slopes) corresponding to the sections of the effects bar 520. Keyframes 611-616 are inserted along the playback curve 600 corresponding to the speed transitions. The keyframes 611-615 are equally spaced in playback time such that the different sections of the speed ramp have nearly equal durations. The keyframe 616 is inserted for one short duration of playback time before t' 1 during which the playback speed is 0%.

Figure 7:
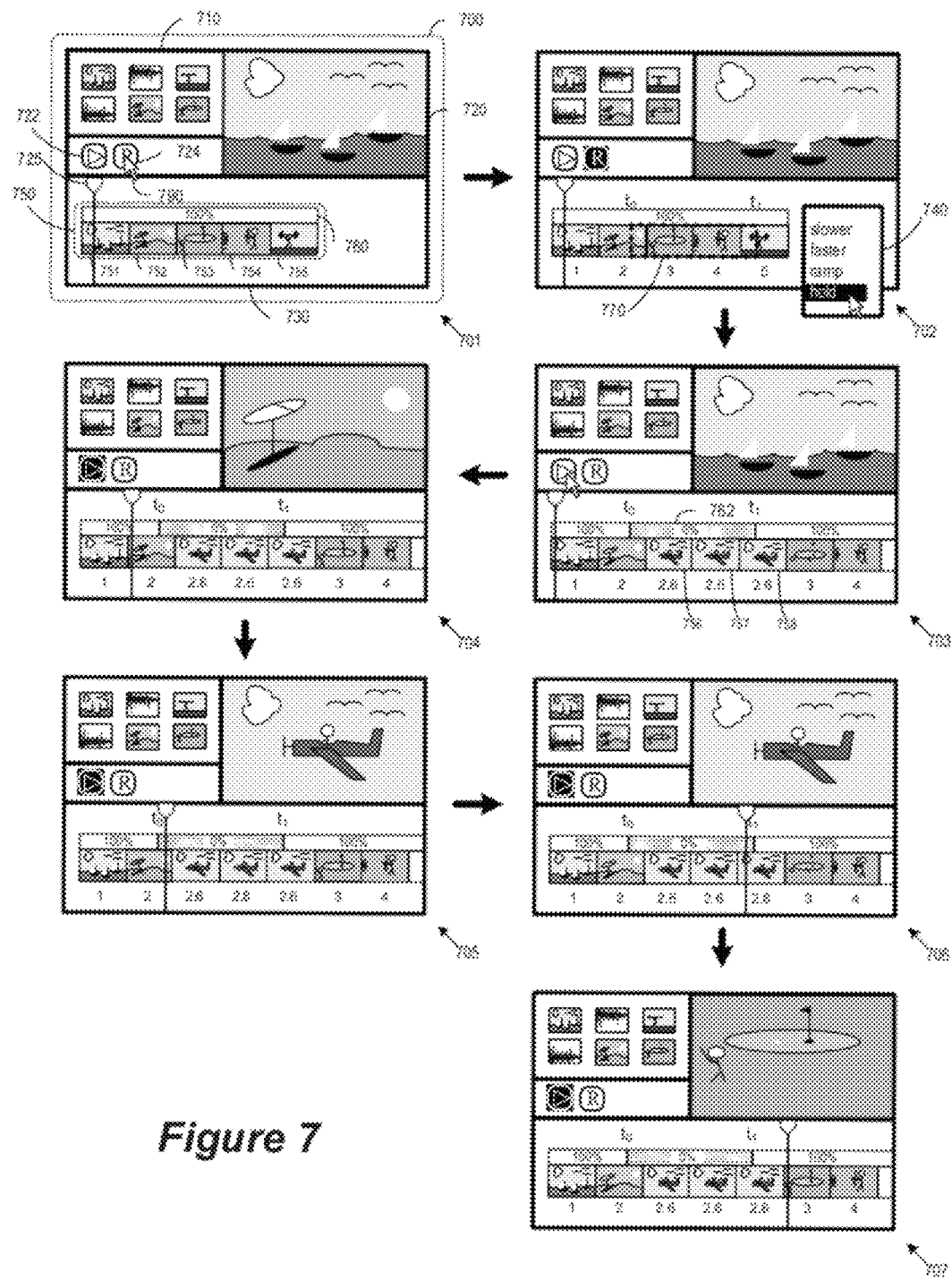
FIG. 7 illustrates an example "hold" retiming operation.

Some embodiments of the media editing application include speed effects that cause playback to pause or hold at a particular video frame. FIG. 7 illustrates an example "hold" retiming operation. FIG. 7 illustrates a GUI 700 that is similar to the GUI 100 of FIG. 1. FIG. 7 illustrates the hold retiming operation in seven different stages 701-707 of the GUI 700. The GUI 700 includes a media library area 710, a preview display area 720, and a timeline 730. The GUI 700 also includes a playback activation item 722 and a retiming tool activation item 724.

The timeline includes a playhead 725 for indicating where in the timeline is currently being displayed at the preview display area 720. The timeline 730 also includes a media clip 750 of video and audio clips. The media clip 750 includes an effects bar 760 that indicates the playback speed of the media clip 750. Unlike the media clip 150 of FIG. 1, however, the media clip 750 displays a series of thumbnail images instead of graphical representations of media clips. Some embodiments allow a user to select between displaying thumbnail images and displaying graphical representations of media clips.

The thumbnails are miniaturized versions of video frames sampled at regular intervals of the playback time from the media content in the media clip 750. The thumbnails display a sequence of images that correspond to the playback speed of the media clip 750. For purpose of illustration, each thumbnail is marked with an index corresponding to the position of the thumbnail image in the media time. For example, a thumbnail image sampled at media time 1 has an index of 1 and a thumbnail image sampled at media time 2.6 has an index of 2.6. One of ordinary skill in the art would realize that such indices are for the purpose of illustration only, and that some embodiments do not display such indices in the thumbnail images. In the example of FIG. 7, thumbnail images 751-755 in the first stage 701 are marked with the indices 1, 2, 3, 4 and 5, indicating that these thumbnail images are sampled at media times 1, 2, 3, 4, and 5.

At the first stage 701, the entirety of the media clip 750 is at normal playback speed (100%) as indicated by the effects bar 760. The preview display area 720 is displaying a video image with an index of 1, since the playhead 725 is at a position near the start of the thumbnail 751 with index 1. The first stage 701 also shows the cursor 790 placed over the retiming activation item 724 for activating retiming operations.

The second stage 702 shows the selection of a range 770 after the activation of the retiming operations (indicated by the highlighting of the item 724). The second stage 702 also illustrates a selection of a "hold" speed effect preset from an effects menu 740. As the range 770 starts at playback time t0 to playback time t1, the hold operation would cause the playback to pause/hold at a video frame starting from t0 until t1.

The third stage 702 shows the result of the "hold" operation. A new section 762 appears in the effects bar 760 starting from playback time t0 to playback time t1. The section 762 indicates a playback speed at 0% of normal due to the hold retiming operation. The new thumbnail images 756-758 are sampled between the playback time t0 and t1. Since the playback is on "hold" and thus frozen between t0 and t1, the thumbnail images sampled during this period do not change (remain at index 2.6). Thumbnail images sampled after the section 762 would once again progress according to playback speed of 100%. The third stage 703 also shows the cursor 790 placed over the playback activation item 722 in order to start playback of the media content in the timeline. The preview display area 725 displays a video frame near the start of the first thumbnail (an image with the index 1).

The fourth, fifth, sixth and seventh stages 704-707 show the playback of the composite presentation in the timeline 730 after the hold retiming operation. During stages 704-707, the playback activation item is highlighted, indicating that the playback of the composite presentation is in progress.

At the fourth stage 704, the playhead has moved onto a position immediately after the second thumbnail 752, and the preview display area 720 accordingly displays a video image in the corresponding thumbnail. At the fifth stage 705 and at the sixth stage 706, the playhead 725 traverses a portion of the central compositing lane that has 0% playback speed, and the preview display area 720 is frozen at a video image that is similar to the thumbnail images 756-758 (all have index 2.6).

At the seventh and the final stage 707, the playhead has moved out of the 0% playback speed portion and once again progresses at 100% speed. The preview display area 720 accordingly displays a new video image (index 3).

Figure 8:
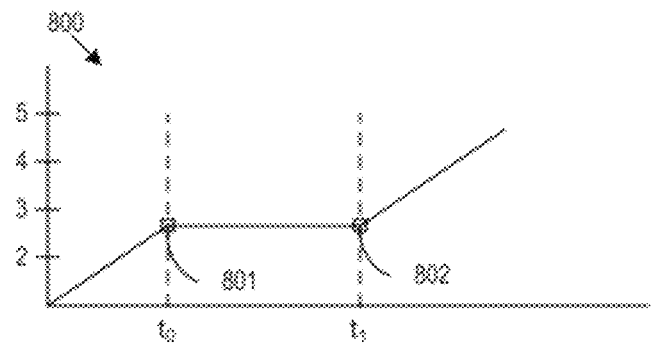
FIG. 8 illustrates a playback curve in accordance with the example hold retiming operation of FIG. 7.

FIG. 8 illustrates a playback curve 800 in accordance with the example hold retiming operation of FIG. 7. The playback curve 800 has two keyframes 801 and 802 inserted in the playback curve 800. The first keyframe 801 is at t0, corresponding to the start of the range 770 selected for the hold retiming operation. The second keyframe 802 is at t1, corresponding to the end of the selected range 770. The playback curve between t0 and t1 has a slope correspond to 0% playback speed (there is no change in media time while playback time has moved from t0 to t1).

Figure 9:
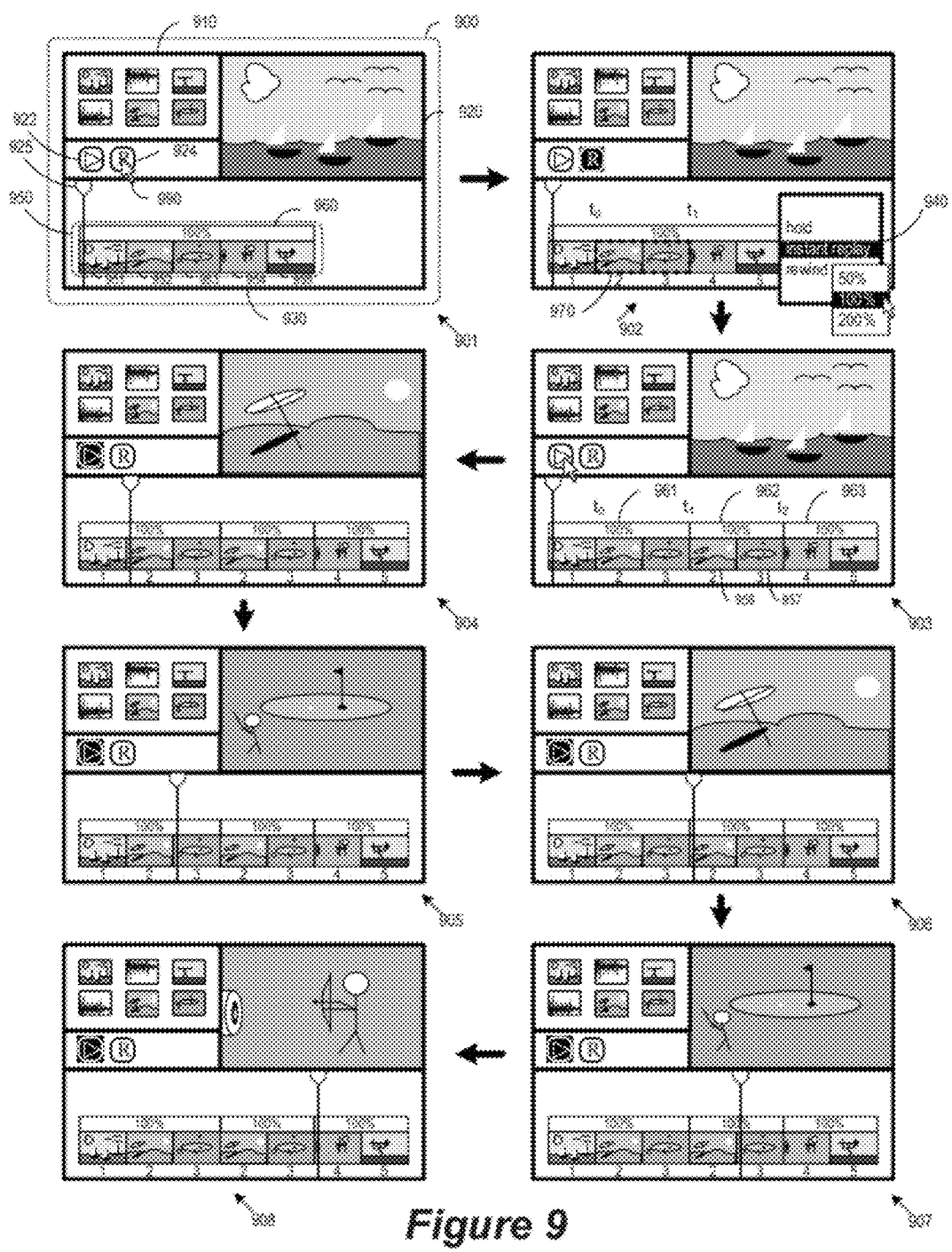
FIG. 9 illustrates an instant replay retiming operation that repeats media content in a selected range in a forward direction.
Figure 11:
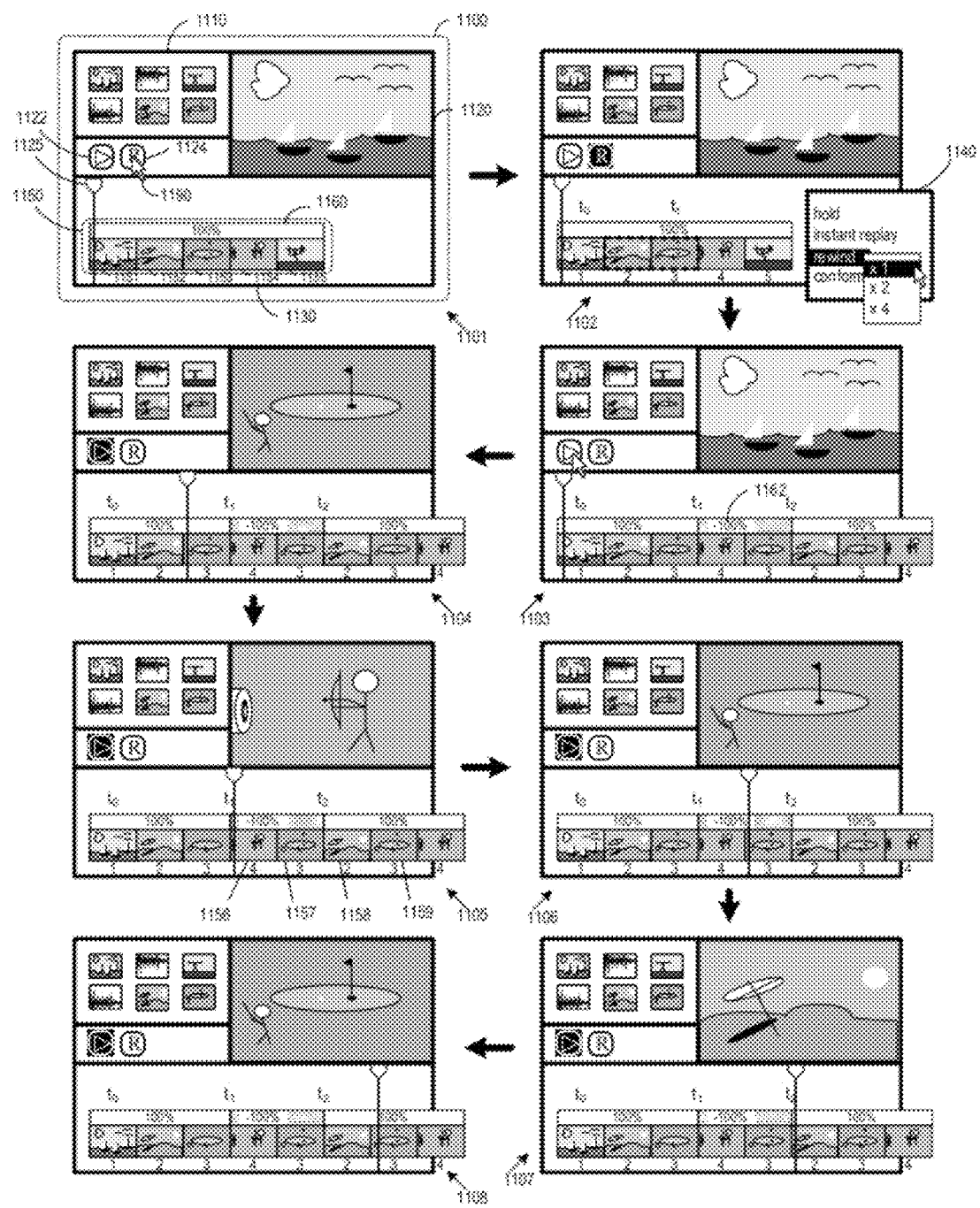
FIG. 11 illustrates a rewind retiming operation that repeats media content in a selected range in a reverse direction.

In some embodiments, the media editing application includes preset operations that repeat a section of a clip or a media clip. FIG. 9 illustrates an instant replay retiming operation that repeats media content in a selected range in a forward direction, while FIG. 11 illustrates a rewind retiming operation that repeats media content in a selected range in a reverse direction.

FIG. 9 illustrates the instant replay retiming operation in eight different stages 901-908 of a GUI 900 that is similar to the GUI 700 of FIG. 7. The GUI 900 includes a media library area 910, a preview display area 920, a playback activation item 922, a retiming activation item 924 and a timeline 930. The timeline 930 includes a playhead 925 and a media clip 950 of video and audio clips. The media clip 950 includes an effects bar 960 that indicates the playback speed of the media clip 950. Like the media clip 750 of FIG. 7, the media clip 950 also displays a series of thumbnail images that are miniaturized video frames sampled from the media content in the media clip 950 at regular intervals of the playback time. Like the thumbnails in FIG. 7, thumbnails in FIG. 9 are also indexed according to the position of the thumbnail image in media time for illustration purposes.

At the first stage 901, the entirety of the media clip 950 is at normal playback speed (100%) as indicated by the effects bar 960. The media clip 950 displays five thumbnail images 951-955, indexed as 1, 2, 3, 4, and 5 at the current zoom level. The preview display area 920 is displaying a video image with an index of 1, since the playhead 925 is at a position near the start of the thumbnail 951 with index 1. The first stage 901 also shows the cursor 990 placed over the retiming activation item 924 for activating retiming operations.

The second stage 902 shows the selection of a range 970 after the activation of the retiming operations (indicated by the highlighting of the item 924). The second stage 902 also illustrates a selection of an "instant replay" preset from an effects menu 940 at a speed of 100%. As the range 970 starts at playback time t0 to playback time t1, the instant replay operation would cause the playback to repeat the media content contained within t0 to t1. One of ordinary skill in the art would recognize that the repeated media content can be at any playback speed. For example, the user can select to perform instant replay at 50% normal speed or at 200% normal speed.

The third stage 903 illustrates the result of the instant replay retiming operation. As illustrated, the media content from t0 and t1 is repeated at t1. The media editing application accordingly has created a new section 962 in the effects bar 960 starting from t1 and ending at t2 corresponding to the repeated media content. The thumbnails in the media clip 950 also reflect the repetition of media content due to the instant replay operation (i.e., the thumbnails repeat indices 2 and 3 within the section 962. The third stage 903 also shows the cursor 990 placed over the playback activation item 922 in order to start playback of the media content in the timeline. The preview display area 925 displays a video frame near the start of the first thumbnail (an image with the index 1).

The fourth, fifth, sixth, seventh, and eighth stages 904-908 show the playback of the composite presentation in the timeline 930 after the instant replay retiming operation. During stages 904-908, the playback activation item 922 is highlighted, indicating that the playback of the composite presentation is commencing.

At the fourth stage 904, the playhead 925 has moved into a position immediately after the start of the second thumbnail 952, and the preview display area 920 accordingly displays a video image similar to the thumbnail 952 (index 2). Likewise at the fifth stage 905, the playhead 925 moved into a position immediate after the start of the third thumbnail 953, and the preview area accordingly displays a video image similar to the thumbnail 953 (index 3).

The sixth and the seventh stages show the playhead traversing the portion of the central compositing lane that has the repeated media content. At the sixth stage 906, the playhead is once again at the start of a thumbnail with index 2 (thumbnail 956), causing the preview display area to display a video image similar to the image in the thumbnail 956. At seventh stage 907, the playhead is once again at the start of a thumbnail with index 3 (thumbnail 957), causing the preview display area to display a video image similar to the image in the thumbnail 957.

At the eighth and the final stage 908, the playhead has moved out of the repeated section 962 and into a section 963. The preview display area 920 accordingly displays a new video image (index 4).

Figure 10:
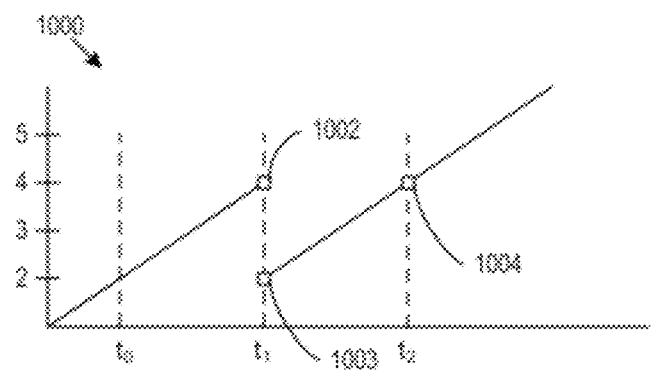
FIG. 10 illustrates a playback curve in accordance with the example instant replay retiming operation of FIG. 9.

FIG. 10 illustrates a playback curve 1000 in accordance with the example instant replay retiming operation of FIG. 9. The instant replay operation causes the playback curve 1000 to repeat the section from t0 to t1 starting at t1. The playback curve 1000 has three keyframes 1002, 1003 and 1004 inserted due to the instant replay preset. The first keyframe 1002 is at t1, corresponding to the end of section immediately before the start of the instant replay. The repeated section due to instant replay is bookended by the keyframes 1003 and 1004.

FIG. 11 illustrates a rewind retiming operation in eight different stages 1101-1108 of a GUI 1100 that is similar to the GUI 700 of FIG. 7. The GUI 1100 includes a media library area 1110, a preview display area 1120, a playback activation item 1122, a retiming activation item 1124 and a timeline 1130. The timeline 1130 includes the playhead 1125 and a media clip 1150 of video and audio clips. The media clip 1150 includes an effects bar 1160 that indicates the playback speed of the media clip 1150. Like the media clip 750 of FIG. 7, the media clip 1150 also displays a series of thumbnail images that are miniaturized video frames sampled from the media content in the media clip 1150 at regular intervals of the playback time. Like the thumbnails in FIG. 7, thumbnails in FIG. 11 are also indexed according to the position of the thumbnail image in media time for illustration purposes.

At the first stage 1101, the entirety of the media clip 1150 is at normal playback speed (100%) as indicated by the effects bar 1160. The media clip 1150 displays five thumbnails images 1151-1155, indexed as 1, 2, 3, 4, and 5. The preview display area 1120 is displaying a video image with an index of 1, since the playhead 1125 is at a position near the start of the thumbnail 1151 with index 1. The first stage 1101 also shows the cursor 1190 placed over the retiming activation item 1124 for activating retiming operations.

The second stage 1102 shows the selection of a range 1170 after the activation of the retiming operations (indicated by the highlighting of the item 1124). The second stage 1102 also illustrates a selection of a "rewind" preset from an effects menu 1140 at a speed of ×1 (i.e., 100%). As the range 1170 starts at playback time t0 to playback time t1, the rewind operation would cause the playback to repeat the section between t0 and t1 at a reverse direction starting immediately after t1. One of ordinary skill in the art would recognize that the selected section can be played in reverse at any speed. For example, the user can select to rewind at 50% normal speed or at 200% normal speed.

The third stage 1103 illustrates the result of the rewind retiming operation. As illustrated, the media content from t0 and t1 is repeated at t1 in the reverse direction, and then repeated at t2 in the forward direction (thus giving the visual appearance of video rewind from t1 to t0). The media editing application accordingly has created a new section 1162 in the effects bar 1160 starting from t1 and ending at t2, corresponding to the repeated media content. The media content in the section 1162 performs playback in reverse direction (−100% of normal speed). The thumbnails in the media clip 1150 also reflect the reverse repetition of media content due to the rewind operation (i.e., the newly appeared thumbnails 1156 and 1157 went in reverse direction from index 4 to index 2 in the section 1162). The third stage 1103 also shows the cursor 1190 placed over the playback activation item 1122 in order to start playback of the media content in the timeline. The preview display area 1125 displays a video frame near the start of the first thumbnail (an image with the index 1).

The fourth, fifth, sixth, seventh, and eighth stages 1104-1108 show the playback of the composite presentation in the timeline 1130 after the rewind retiming operation. During stages 1104-1108, the playback activation item 1122 is highlighted, indicating that the playback of the composite presentation is commencing.

At the fourth stage 1104, the playhead 1125 has moved into a position immediately after the start of the second thumbnail 1152, and the preview display area 1120 accordingly displays a video image similar to the thumbnail 1153 (index 3). Likewise at the fifth stage 1105, the playhead 1125 has moved into a position immediate after the start of the thumbnail 1154, and the preview area accordingly displays a video image similar to the thumbnail 1154 (index 4).

The sixth and the seventh stage show the playhead traversing the portion of the central compositing lane that has the reverse media content. At the sixth stage 1106, the playhead is at the start of another thumbnail with index 3 (thumbnail 1156), causing the preview display area to display a video image similar to the image as displayed in the fourth stage 1104. At seventh stage 1107, the playhead 1125 has traversed all the way to the end of the reverse media content. The preview display area now displays a video image similar to the thumbnail 1158 with index 2.

After traversing the reverse playback section 1162, the playback resumes in forward direction. The eighth and the final stage 1108 shows the resumption of the forward playback. The playhead 1125 is immediate after the start of a thumbnail with index 3.

Figure 12:
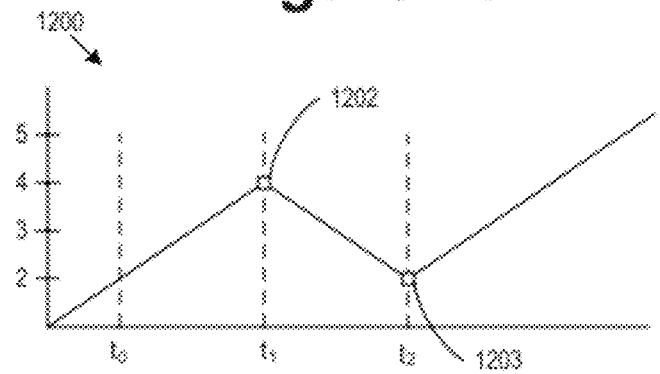
FIG. 12 illustrates a playback curve in accordance with the example rewind retiming operation of FIG. 11.

FIG. 12 illustrates a playback curve 1200 in accordance with the example rewind retiming operation of FIG. 11. The playback curve 1200 has two keyframes 1202 and 1203 inserted due to the rewind preset. The rewind operation causes the playback curve 1200 to repeat the section from t0 to t1 starting at t1. The repeated section of the playback curve 1200 is bookended by the keyframes 1202 at t1 and 1203 at t2. Unlike the repeated section in FIG. 10 created by instant replay, the repeated section created by the rewind operation has a negative slope corresponding to a negative playback speed. After t2, the playback curve resumes forward playback and has positive slope.

In some embodiments, the video playback of a composite presentation being composited by the media editing application is conducted at a particular frame rate. However, the source media content (e.g., source video clips in the media library) that is used to construct the composite presentation may not have the same frame rate. In such cases, some embodiments construct interpolated frames in order to convert frames from a native frame rate to the particular frame rate of the composite presentation. The interpolation of video frames will be discussed further below in Section III.

In some embodiments, the media editing application provides a retiming speed effect preset that plays every frame of a video clip at a rate that conforms with the particular frame rate of the media editing application. For example, a media editing application in some embodiments plays at a standard frame rate of 24 frames per second, while a piece of high resolution media content produced by a high speed camera may have 60 frames per second. Playing such high resolution piece of media at 100% normal speed requires down sampling of the frames (e.g., playing back only two frames for every five available.) Some embodiments provide a "conform speed" preset that plays every frame of the piece of high resolution media within a selected range at the standard 24 frames per second. The result is a section that plays every frame of the high resolution media content, albeit at a slower rate of 40% of normal speed (i.e., 24/60).

One of ordinary skill in the art would recognize that the "conform speed" retiming operation is applicable regardless of the source frame rates and the playback frame rates. For some embodiments, FIG. 13 illustrates an example "conform speed" retiming operation performed on a piece of media content that has a source frame rate that is three times the playback frame rate of the composite presentation.

Figure 13:
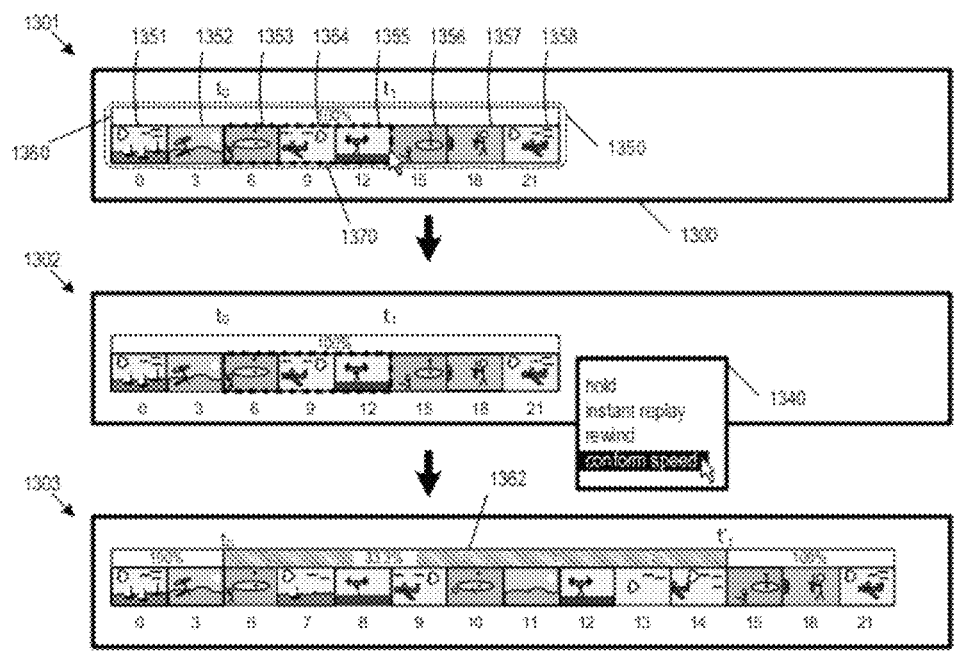
FIG. 13 illustrates an example "conform speed" retiming operation.

FIG. 13 illustrates a timeline 1300 in a GUI of a media editing application similar to the GUI 700. Within the timeline 1300 is a media clip 1350. The media clip displays a series of thumbnail images sampled at regular intervals of the playback time from the media clip 1350. Each thumbnail image is labeled with an index that reflects the position of the thumbnail image in media time for purpose of illustration. The media clip 1350 also displays an effects bar 1360 that indicates the playback speed of the media content in the container.

FIG. 13 illustrates the example "conform speed" retiming operation in three stages 1301-1303. At the first stage 1301, the effects bar 1360 of the content media clip 1350 indicates that the entire media clip is at 100% of normal speed. The thumbnails 1351-1358 are indexed at increments of 3 (0, 3, 6, 9 . . . ) at the current zoom level, which correspond to playing back the media content at the standard frame rate. The first stage 1301 also illustrates the selection of a range 1370 that starts at playback time t0 and ends at playback time t1. In some embodiments, the range selection function is activated after the user has chosen to activate a retiming tool such as by selecting the retiming activation item 724 of the GUI 700.

The second stage shows the selection of the "conform speed" retiming operation preset from an effects menu 1340. The "conform speed" retiming operation will be applied to the media content in the selected range 1370 between the playback times t0 and t1.

The final and third stage illustrates the result of the retiming operation. A new section 1362 has appeared in the effects bar 1360 that correspond to the selected range 1370.

The new section 1362 ends at t'1 instead of t1 because its duration is three times as long as the selected range 1370. This section corresponds to a portion of media content that is to be played back at 33.3% normal speed because every frame of the source media content is being played back. Since the source frame rate of the media content is three times the playback frame rate, the playback speed is effectively reduced to 33.3% of normal. The thumbnail images under the section 1362 reflect the reduced playback speed, as they are thumbnails indexed at increments of 1 (6, 7, 8, 9, 10, 11 . . . ).

Figure 14:
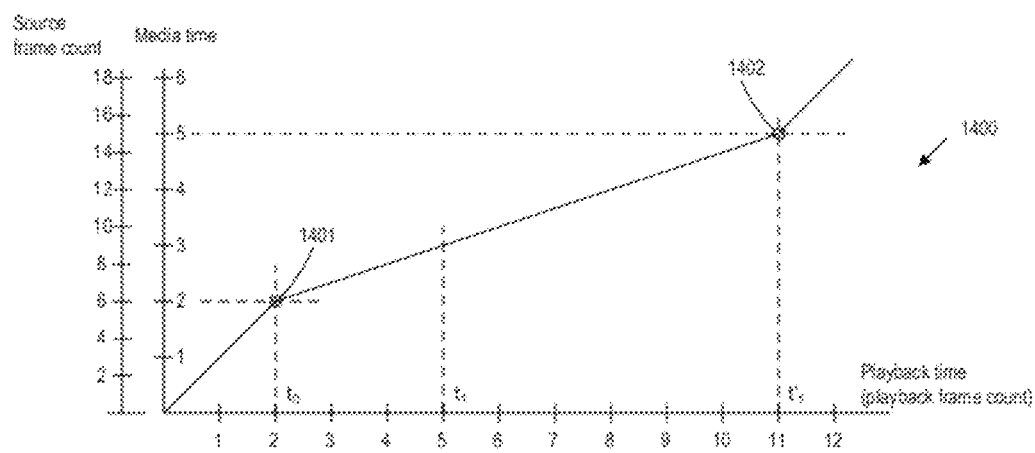
FIG. 14 illustrates a playback curve that corresponds to the "conform speed" retiming operation of FIG. 13.

FIG. 14 illustrates a playback curve 1400 that corresponds to the "conform speed" retiming operation of FIG. 13. The curve has two keyframes 1401 at t0 and 1402 at t'1. The section of the playback curve 1400 before the first keyframe 1401 has a playback speed of 100% normal, meaning that the playback time is elapsing at the same rate as media time. During this section of the curve, only one out of every three frames from the media content is being played back.

The section of the curve 1400 after t0 and before t'1 corresponds to the section with the "conform speed" retiming speed effect. During this section of the curve, every frame of the media content is played, but media time is elapsing at only ⅓ of previous rate, showing a 33% playback speed.

II. Speed Effects Manipulations

As mentioned above, media editing application of some embodiments provides preset speed effects so a user can quickly achieve an initial retiming effect on a selected range in the composite presentation. The initial retiming effect can then be used as a template for further adjustments and refinements by the user for desired result. FIGS. 15-16 illustrate examples of such further adjustments and refinements of speed effects. In some embodiments, the adjustment of the speed effect is accomplished by adjusting individual speed effect sections that have been created by the earlier preset speed effects. In some of these embodiments, effects bars associated with each speed effect section have graphical handles that can be manipulated by the user to adjust the speed effect.

Figure 15A:
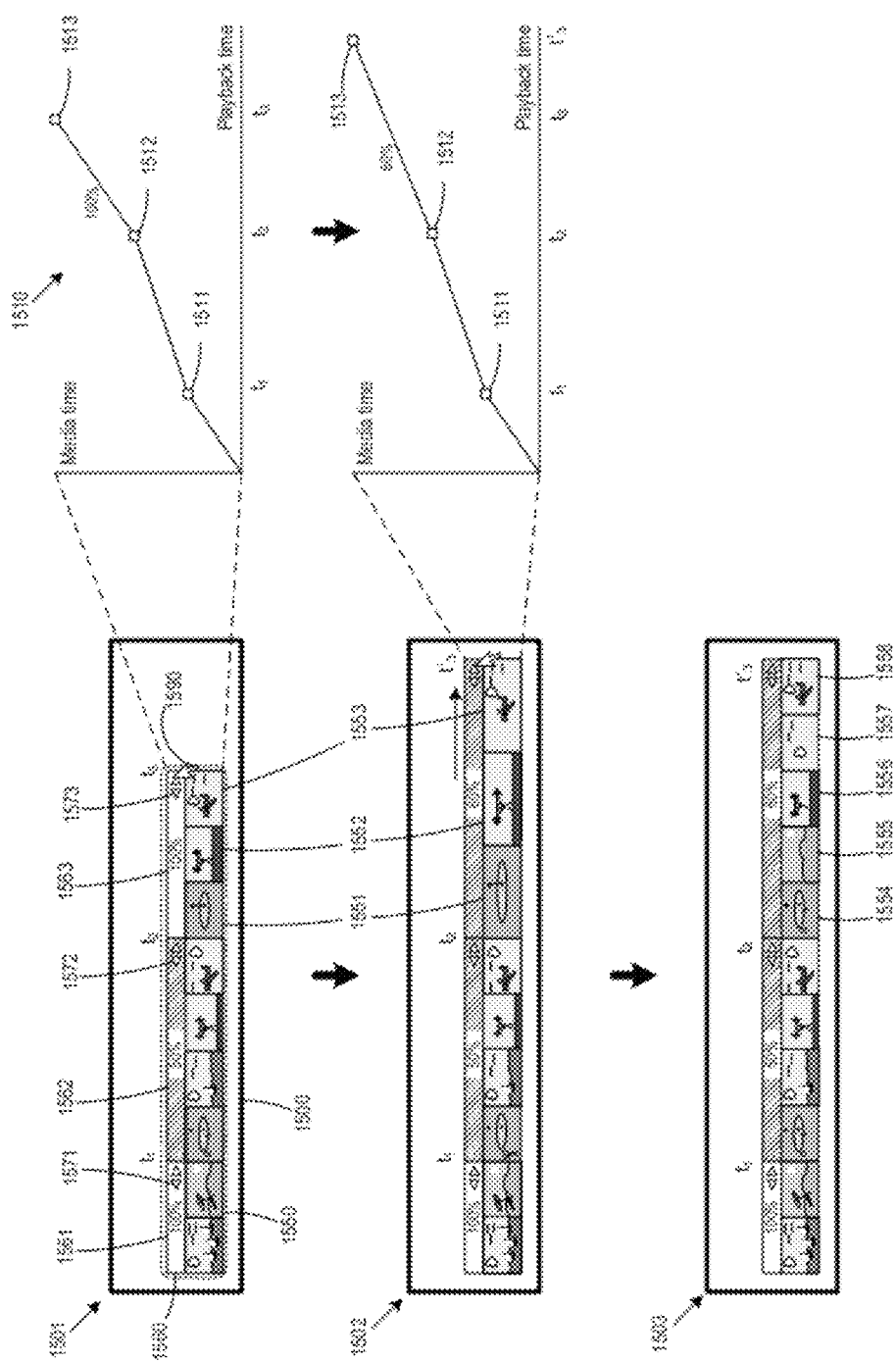
FIGS. 15a-b illustrate an example speed effect adjustment operation of a media clip that has been partitioned by an earlier preset retiming operation.
Figure 15B:
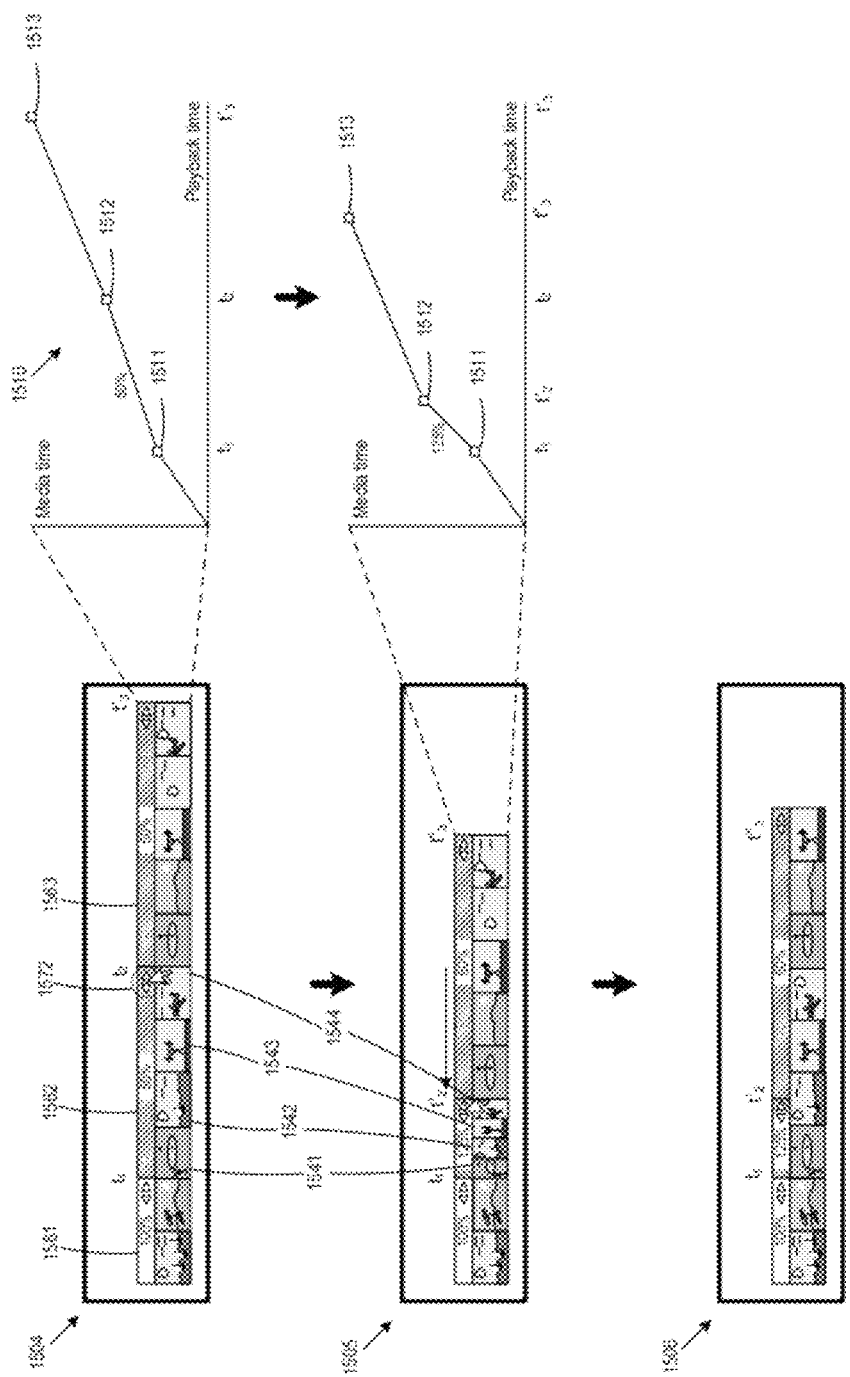

FIGS. 15a-b illustrate an example speed effect adjustment operation of a media clip that has been partitioned by an earlier preset retiming operation. FIGS. 15a-b illustrate a timeline 1500 of a GUI similar to the GUI 700 of a media editing application. Within the timeline 1500 is a media clip (or media container) 1550. The media clip displays a series of thumbnail images sampled at regular intervals of the playback time from the images in the media clip 1550. FIGS. 15a-b also illustrate a playback curve 1510 associated with the media clip 1550.

The media clip 1550 also displays an effects bar 1560 that indicates the playback speed of the media content in the container. The effects bar is partitioned into three sections 1561-1563 by one or multiple previous preset speed effect operations such as the "slower" operation discussed earlier by reference to FIGS. 1-2. In addition to displaying the playback speed, each section of the effects bar also includes a handle for adjustment of speed effects.

FIGS. 15a-b illustrate the example speed effect adjustment operation by user manipulation in six stages 1501-1506. The first stage 1501 in FIG. 15a shows the media clip 1550 before user adjustment of speed effect. The section 1562 is at 50% speed while sections 1561 and 1563 remain at 100% speed. The section 1561 ends at playback time t1, the section 1562 ends at playback time t2 while the section 1563 ends at playback time t3. The playback curve 1510, which corresponds to stage 1501, consequently includes three keyframes 1511-1513 at playback times t1, t2 and t3. The first stage 1501 also shows a cursor 1590 placed over a handle 1573 of the section 1563 for performing a click and drag operation.

The second stage 1502 in FIG. 15a shows the user adjustment of speed effect by the click and drag operation. As illustrated, the user has clicked and dragged the handle 1573 toward the right through the cursor 1590, which causes the section 1563 to expand from t3 to t'3. Some embodiments visually animate the expansion of the thumbnails. In some other embodiments, the GUI does not display the expanded thumbnails. The graphical expansion also corresponds to movement of the keyframe 1513 from t3 to t'3, which results in an expansion in playback time and reduction in playback speed (from 100% to 60%) for the media content in the section 1563.

In some embodiments, the graphical expansion of a speed effect section is accompanied by graphical stretching of thumbnail images in that section. As illustrated, the thumbnails 1551-1553 have been graphically stretched along with the section 1563.

The third stage 1503 in FIG. 15a shows the media clip after the speed effect adjustment. The playback speed of section 1563 has been reduced to 60% of normal speed. In place of the three stretched thumbnails 1551-1553, there are five new thumbnails 1554-1558 that display a sequence of images corresponding to the new 60% playback speed.

The fourth stage 1504 in FIG. 15b illustrates the start of another speed adjustment operation by user manipulation. The cursor 1590 is placed over the graphical handle 1572 of the second effects bar section 1562 for performing a second click and drag operation.

The fifth stage 1505 in FIG. 15b shows the user adjustment of speed effect by the second click and drag operation. As illustrated, the user has clicked and dragged the handle 1572 toward the left through the cursor 1590, which causes the section 1562 to contract from t2 to t'2. The graphical contraction also corresponds to movement of the keyframe 1512 from t2 to t'2 which results in a compression in playback time and an increase in playback speed (from 50% to 125%) for the media content in the section 1562. The thumbnail images 1541-1544 under the section 1562 are accordingly compressed. Some embodiments visually animate the compression of the thumbnails. In some other embodiments, the GUI does not display the compressed thumbnails. The section 1563 shifts to the left due to the compression of the section 1562, which causes the keyframe 1513 to move from t'3 to t"3.

The sixth and final stage 1506 in FIG. 15b shows the media clip after the speed effect adjustments by user manipulation. The playback speed of section 1562 has been increased to 125% of normal speed. The compressed thumbnails have disappeared and the GUI displays a new set of thumbnails after playback time t1 by sampling the media content according to the playback speeds specified by the different sections.

In addition to adjusting playback speed of individual sections of the effects bar of a media clip, a user can also adjust the range of individual sections partitioned by retiming presets. FIG. 16 illustrates an example range adjustment operation of a media clip that has been partitioned by an earlier preset retiming operation. FIG. 16 illustrates a timeline 1600 of a GUI that is similar to the GUI 700 of a media editing application.

Within the timeline 1600 is a media clip (or media container) 1650. The media clip displays a series of thumbnail images sampled at regular intervals of the playback time from the media clip 1650. FIG. 16 also illustrates a playback curve 1610 associated with the media clip 1650.

The media clip 1650 also displays an effects bar 1660 that indicates the playback speed of the media content in the container. The effects bar is partitioned into three sections 1661-1663 by one or multiple previous preset speed effect operations such as the "slower" or "faster" retiming operations discussed earlier by reference to FIGS. 1-2. In addition to displaying the playback speed, each section of the effects bar also includes a handle for adjustment of speed effects and a UI item that provides access to commands specific to the section (handles 1671-1673 for the sections 1661-1663 respectively). In addition to the handles 1671-1673 for adjustment of speed effects, each of the speed effect bars sections also includes a UI item for opening a contextual menu item (UI items 1681-1683 for sections 1661-1663 respectively).

FIG. 16 illustrates the example range adjustment operation by user manipulation in four stages 1601-1604. The first stage 1601 shows the media clip 1650 before user adjustment of the range. The section 1661 is at 100% speed, the sections 1662 is at 50% speed, and the section 1663 is at 150% of normal speed. The section 1661 ends at playback time t1, the section 1662 ends at playback time t2 while the section 1663 ends at playback time t3. The playback curve 1610 consequently includes three keyframes 1611-1613 at playback times t1, t2 and t3. The first stage 1601 also shows a cursor 1690 placed over the UI 1682 of the section 1661 for opening a contextual menu item.

The second stage 1602 shows the opening of the contextual menu 1640 and the selection of a command specific to the section 1661. The contextual menu 1640 is opened as a result of the selection of the UI item 1682. As illustrated, the contextual menu item includes commands such as "slow", "fast", "normal" and "change end" that are specific to the section 1661. The command "slow" slows the playback speed of the section 1661. The command "faster" accelerates the playback speed of the section 1661. The command "normal" reset the playback speed of the section 1661 to 100% of normal speed. One of ordinary skill in the art would recognize that these commands are similar to the preset "slower" and "faster" operations as illustrate above by reference to FIGS. 1-2. However, unlike the preset commands which apply to a selected range as discussed above in section I, these contextual commands apply only to the specific section from which the contextual command is invoked.

The "change end" command is also a contextual command applicable only to the section 1661. It changes the position of the end of the section 1661 and the start of the section 1662 in media time. In other words, the "change end" command shifts the border between the sections 1661 and 1662 such that some media content that were once in section 1662 becomes part of the section 1661 (or vice versa).

The third stage 1603 shows the appearance of a "change end" tool UI item 1695 after the invocation of the "change end command". The "change end" tool UI item 1695 is situated at the border (at t1) between the sections 1661 and 1662 so the user can manipulate the UI item 1695 to shift the border between the two sections. In some embodiments, the preview display area displays a video image that is being pointed to by the UI item 1695 in order to facilitate the precise placement of the border. In some embodiments, such a preview display area is similar to the preview display area 720 of GUI 700 in FIG. 7. The third stage 1603 also shows the cursor 1690 placed over the "change end" tool UI item 1695 and ready to perform a range adjustment operation.

The fourth and final stage 1604 shows the result of the range adjustment operation by manipulation of the "change end" tool UI item 1695. As illustrated, the user has used the cursor 1690 to drag the UI item 1695 from t1 to t'1. However, since the section 1661 has a different playback speed (100%) than the section 1662 (50%), the border shift made by the "change end" operation causes all media content after t'1 to shift. Consequently, the keyframe 1611 has shifted from t1 to t'1 by extending the 100% speed section (section 1661), which causes the 50% section of the playback curve 1610 to start later at t'1. The end of the 50% section (section 1662) must still end at the same media time as before (i.e., 5), which occurs at an earlier playback time t'2, causing the 150% section (section 1663) and the keyframe 1613 to shift earlier in playback time.

FIG. 16 illustrates an example range adjustment operation by invoking a command that adjusts the end of a section of a media clip (or the media clip's effects bar) thus shifting the border between the section and an immediately subsequent sections. One of ordinary skill in the art would recognize that such a command is functionally equivalent to a command that changes the start of the section, which adjusts the border between the section and an immediately preceding section. Some of these embodiments include both "change end" and "change start" command in a contextual menu of the section.

III. Mapping of Playback Curves

A. Interpolation

The playback curve as discussed above in Sections I and II maps an instant in playback time to an instant in media time. In some embodiments, the mapped media time is then used to fetch a frame from the source media clip. However, not all media time instants mapped by the playback curve has a video frame that is specified to be displayed at that precise moment. For example, a playback curve may specify a media time that is temporally half way between two video frames in the original media clip. In these instances, it can be unclear as to which video frame should the media editing application fetch for display. In such cases, some embodiments produce an interpolated frame based on other frames in the media clip that are in the vicinity of the media time.

Figure 17:
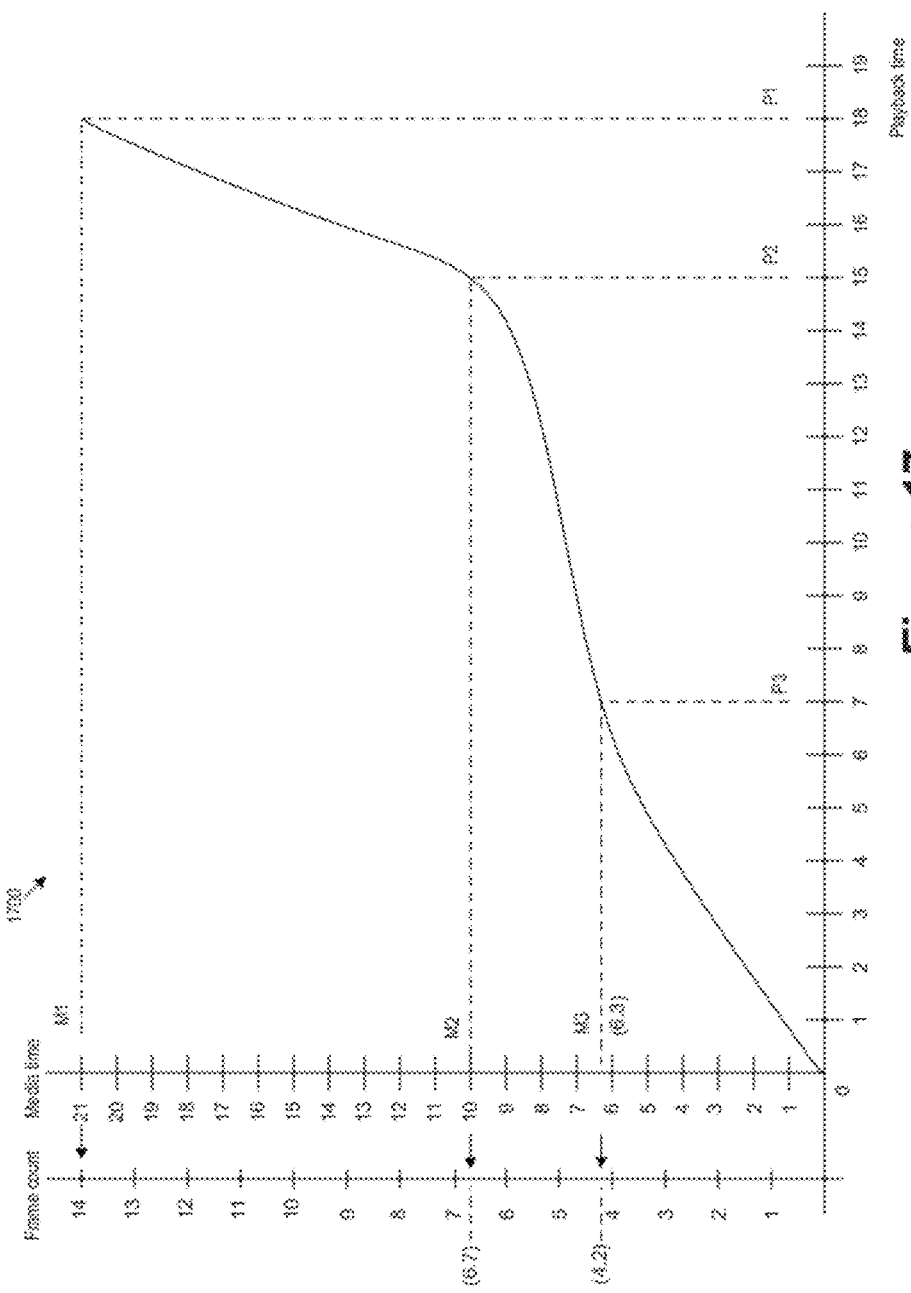
FIG. 17 illustrates the mapping of a playback curve from playback time to media time and then to actual video frames in the source of the media content.

For some embodiments, FIG. 17 illustrates the mapping of a playback curve from playback time to media time and then to actual video frames in the source of the media content. FIG. 17 illustrates an example playback curve 1700 that maps playback time (x-axis) to media time (y-axis). FIG. 17 also illustrates frame count scale 1710 that shows the mapping from media time to an actual video frame in a source media clip. In some embodiments, each integer unit of playback time corresponds to one playback video frame, such that the playback time N corresponds to the Nth playback video frame.

As illustrated, the playback curve 1700 maps the playback time instant P1 (at playback time 18 or playback video frame 18) to the media time instant M1 (media time 21), which precisely or very nearly maps to frame count 14 on the frame count scale 1710. Not all playback video frames (or integer playback times) map precisely onto an actual video frame in the source media clip. For example, the playback time instant P2 (at playback time 15) maps to media time instant M2 (media time 10) and then to a position 6.7 in the frame count scale 1700 that is positioned between source video frames 6 and 7. Likewise the playback time instant P3 (at playback time 7) maps to media time instant M3 (media time 6.3), which maps to a position 4.2 in the frame count scale 1700 which is positioned between the source video frame 4 and 5.

In some embodiments, a playback time instant that maps to a media time instant sufficiently close to an actual video frame (on the frame count scale) does not require an interpolated frame. In some of these embodiments, the difference in media time between the position of the actual video frame and the mapped playback position is compared against a threshold. If the difference is within such a threshold, interpolation will not be performed and the actual video frame (the nearest frame to the mapped playback position) is fetched directly for playback.

For a playback time instant that does not map to a media time instant sufficiently close to an actual video frame, some embodiments generate an interpolated frame. In some other embodiments, interpolation is always performed, even if a playback time instant maps exactly on to an actual video frame in the source media content.

Some embodiments perform interpolation by using the nearest neighboring video frame in the source media content as the interpolated frame. For example, for playback frame 7 (P3) that maps on to position 4.2 in the frame count scale (M3), the actual frame 4 in the source media content will be used as the interpolated frame and be displayed during playback.

Some embodiments perform interpolation by blending video frames. In some of these embodiments, frames neighboring the mapped playback position are blended together to produce the interpolated frame. In some embodiments, frame blending is performed by applying a weighting factor to each of the blended source frames according to the temporal distance between the blended source frame and the mapped playback position. In the example of FIG. 17, for playback frame 15 (P2) that maps to position 6.7, some embodiments produce the interpolated frame by blending source frames 6 and 7 and by applying a weighting factor of 0.7 to frame 7 and a weighting factor of 0.3 to frame 6.

Some embodiments perform interpolation by optical flow. Optic flow is the pattern of apparent motion of objects, surfaces, and edges in a visual scene caused by the relative motion between an observer (an eye or a camera) and the scene. Sequences of ordered images allow the estimation of motion as either instantaneous image velocities or discrete image displacements. Some embodiments create the interpolated frame by estimating motions of pixels using ordered images of frames neighboring the mapped playback position.

Figure 18:
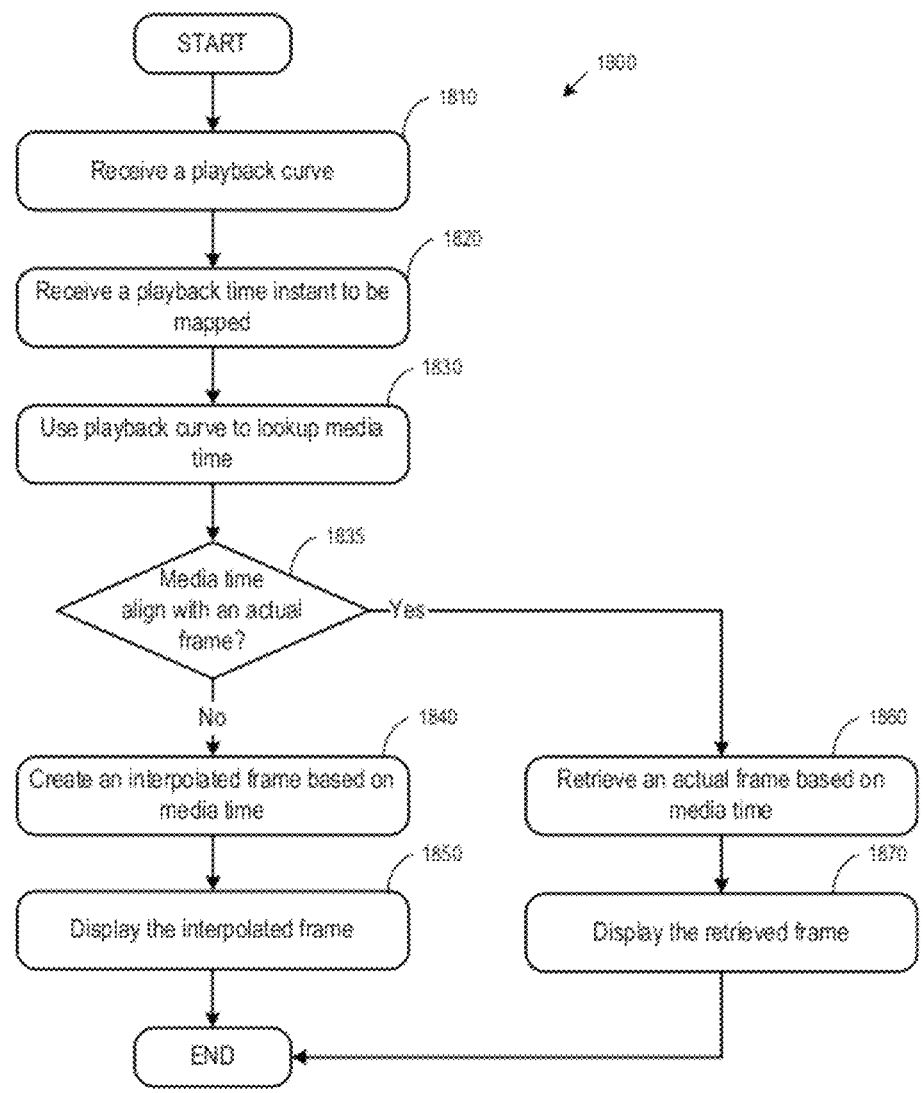
FIG. 18 conceptually illustrates a process 1800 for mapping playback times to actual or interpolated video frames.

For some embodiments, FIG. 18 conceptually illustrates a process 1800 for mapping playback times to actual or interpolated video frames. The process receives (at 1810) a playback curve associated with a media clip that maps instants of playback time to instants in media time. The process next receives (at 1820) a playback time instant to be mapped. In some embodiments, the process 1800 receives such a playback time instant whenever a video frame needs to be fetched from a source media clip, such as when the GUI 100 of FIG. 1 is producing a preview image on the preview display area 120, or when the GUI 700 of FIG. 7 is producing a thumbnail image in a media clip, or when the media editing application is directed by the user to output the product of the composite presentation being constructed in the timeline of the GUI.

The process 1800 next uses (at 1830) the playback curve to look up a media time that corresponds to the received playback time. The process determines (at 1835) whether the media time is sufficiently aligned with an actual frame. If the media time being looked up is sufficiently aligned with an actual frame, the process 1800 proceeds to 1860 to retrieve the actual frame for display. Otherwise the process proceeds to 1840. In some embodiments, the process always proceeds to 1840 and create an interpolated frame regardless of whether the media time is sufficiently aligned with the actual frame.

At 1840, the process creates an interpolated frame based on the media time. The mapping (or look up) of media time and the creation of interpolated frame are described above by reference to FIG. 17. After creating the interpolated frame, the process displays (at 1850) or delivers the interpolated frame. After delivering or displaying the interpolated frame, the process 1800 ends.

At 1860, the process retrieves an actual frame based on the mapped media time. The process 1800 then displays (at 1870) or deliver the retrieved frame. After displaying or delivering the retrieved frame, the process 1800 ends.

B. Curve Smoothing

As mentioned earlier by reference to stage 206 of FIG. 2, some embodiments perform curve smoothing operation on the playback curve in order to prevent abrupt changes in playback speed. The curve smoothing operation adjusts the playback curve near the playback speed discontinuities such that the slope or tangent (i.e., playback speed) of the smoothed playback curve is continuous throughout the curve. In some embodiments, the curve smoothing operation is entirely handled by the media editing application and is not visible to a user nor is it accessible by the user.

In some embodiments, the curve smooth operation is a spline interpolation operation based on keyframes. Some embodiments plug the coordinates of the keyframes as data set into standard mathematical expressions for drawing a smoothed curve. In order to prevent interpolated curve from overshooting and result in unintended fluctuation in playback speed, some embodiments use Monotone Cubic Interpolation technique for performing the curve smooth operation. Monotone Cubic Interpolation is a variant of cubic interpolation that preserves monotonicity of the data set being interpolated. See e.g., pages 238-246 of Fritsch, F. N.; Carlson, R. E. (1980) "Monotone Piecewise Cubic Interpolation"; SIAM Journal on Numerical Analysis (SIAM) 17 (2). Some embodiments specifically set certain parameters for performing the spline interpolation for preventing overshoot and ensuring monotonicity. These parameters cannot be directly accessed or adjusted by the user in some embodiments.

C. Audio Mapping

In some embodiments, each speed effect or retiming operation performed on video content is accompanied by a corresponding speed effect or retiming operation on audio content. A preset retiming operation performed on a selected section of a media clip applies to both video and audio of the selected section of the media clip. In some embodiments that use a same playback curve for both audio and video, every alteration or adjustment to the playback curve (such as retiming or curve smoothing) applies to both video and audio in order to keep audio and video in sync. Each playback time instant is mapped to a media time instant using the playback curve for both video and audio. The slope of the playback curve at each of the playback time instants is used to determine the instantaneous audio playback speed.

In some embodiments, retiming operation affects the playback speed of audio but not the pitch of audio. Some embodiments use common audio pitch preservation techniques to ensure that changes in playback speed would not affect the pitch of audio during playback.

IV. Speed Effects and Anchor Clips

Some embodiments of the media editing application supports anchored clips that are anchored to a particular video frame during playback. And anchored clip is a clip that is set to be displayed (if video) or played (if audio) starting at the playback time of that particular video frame. As retiming operations such as discussed above in Sections I through III can change the timing of any particular video frame, some embodiments ensure that the anchored clip remain anchored to the correct video frame after the retiming operations. Some of these embodiments maps the anchor frame to an anchor media time $T_A$, and then uses the anchor media time $T_A$ to map to the correct new playback time after the retiming operation. Some embodiments reverse map the anchor media time $T_A$ to a unique anchor playback time for the anchored clip by marking a section of the playback curve defined by two keyframes as being associated with the anchored clip.

Figure 19:
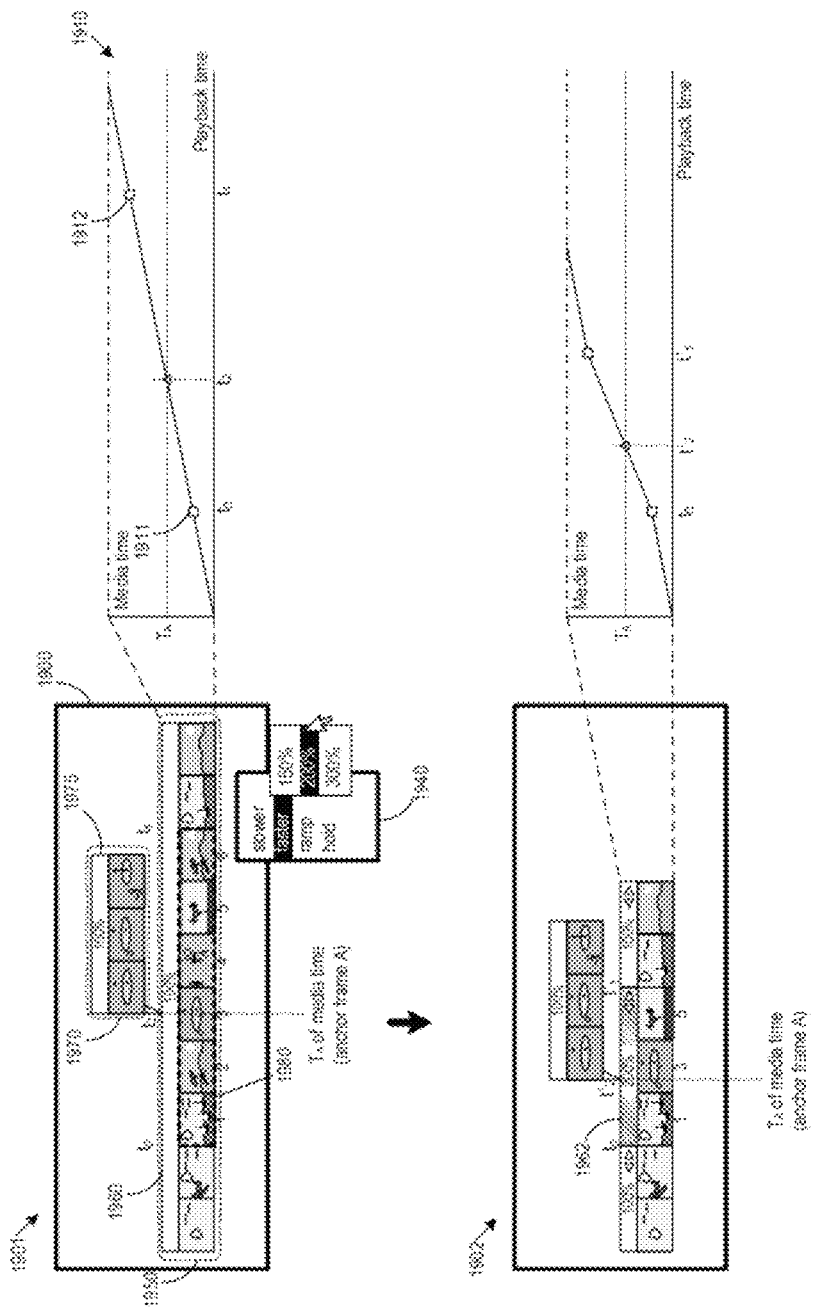
FIG. 19 illustrates an example retiming operations and its effect on anchored clips.

FIG. 19 illustrates an example retiming operations and its effect on anchored clips. FIG. 19 illustrates a timeline 1900 of a GUI similar to the GUI 700 of a media editing application. Within the timeline 1900 is a media clip (or media container) 1950 that is the central compositing lane of the composite presentation being composed in the timeline 1900. The media clip displays an effects bar 1960 that indicates the playback speed of the media content in the media clip 1950. The media clip also displays a series of thumbnail images sampled at regular intervals of the playback time from the images in the media clip 1950. FIG. 19 also illustrates a playback curve 1910 associated with the media clip 1950.

In addition to the media clip 1950, the timeline 1900 includes an anchored clip 1970 that is attached to an anchor frame (frame A). The anchored clip 1970 is set to play when frame A is being displayed. The anchored clip can be a cut away clip that will be displayed instead of the video in the central compositing lane 1950 following frame A, or a graphic effect that is to be overlaid on top of the video in the central compositing lane 1950.

FIG. 19 illustrates the effect of a retiming operation on the anchored clip 1970 in two stages 1901-1902. The first stage 1901 shows the position of the anchored clip relative to the central compositing lane 1950 prior to the retiming operation. The anchor frame (frame A) is at playback time t2, meaning that the anchored clip 1970 is set to be played when the anchor frame is displayed at playback time t2. A range 1980 has been selected by an earlier range selection operation. The range 1980 starts at playback time t0 and ends at playback time t1. In some embodiments, the range selection operation is activated after the user has chosen to activate a retiming tool such as by selecting the retiming activation item 724 of the GUI 700. The first stage 1901 also illustrates the selection of a retiming preset ("faster" at 200%) from an effects menu 1940. The selected "faster" operation will be applied to the selected range 1980.

The playback curve 1900 includes two keyframes 1911 and 1912 at playback time t0 and playback time t1 that corresponds to the selected range 1980. The anchor frame (frame A) is at playback time t2, which maps to an anchor media time $T_A$ according to the playback curve 1910.

The second stage 1902 shows effect of the "faster" retiming operation on the anchored clip 1970. The "faster" retiming operation has caused a new 200% playback speed section 1962 to appear in the effects bar 1960 that correspond to the selected range 1980. The compression of the media content in the selected range 1980 also causes media content after playback time t0 to shift, as illustrated by the shifting of the keyframe 1911 from t1 to t'1. The retiming operation has also shifted the anchored clip 1970 from t2 to a new anchor playback time t'2. Some embodiments determine this new payback time t'2 for the anchored clip by mapping the anchor media time $T_A$ back to the playback time axis using the retimed playback curve 1910 in the second stage 1902.

In some embodiments, retiming operation of the central compositing lane affects only playback speed of media content in the central compositing lane and not the playback speed of the anchored clip. In the example of FIG. 19, the playback speed of the anchored clip remain at 100% normal speed even though the anchored clip is anchored to a section of the central compositing lane 1950 that has been retimed to run at 200% of normal speed. In some embodiments, an anchored clip that is anchored to a section of a media clip gets retimed along with the section of the media clip (i.e., the playback speed of the anchored clip changes according to the retiming operation.)

As mentioned, some embodiments use the anchor media time $T_A$ for determining a new playback time for anchored clip by mapping $T_A$ back to a new anchor playback time using the playback curve. However, some retiming operations repeats a portion of the media clip (such as instant replay or rewind) such that the playback curve cannot guarantee one to one mapping between media time and playback time. In these instances, the anchor media time $T_A$ may map to multiple anchor playback times. In order to determine which of the multiple anchor playback times is the intended by the user, some embodiments keep track of user interaction with the anchored clip in order to determine which section of the media clip or clip is the anchored clip supposed to be anchored to. Some embodiments accomplish this by marking a section of the playback curve defined by two keyframes as being associated with the anchored clip.

Figure 20A:
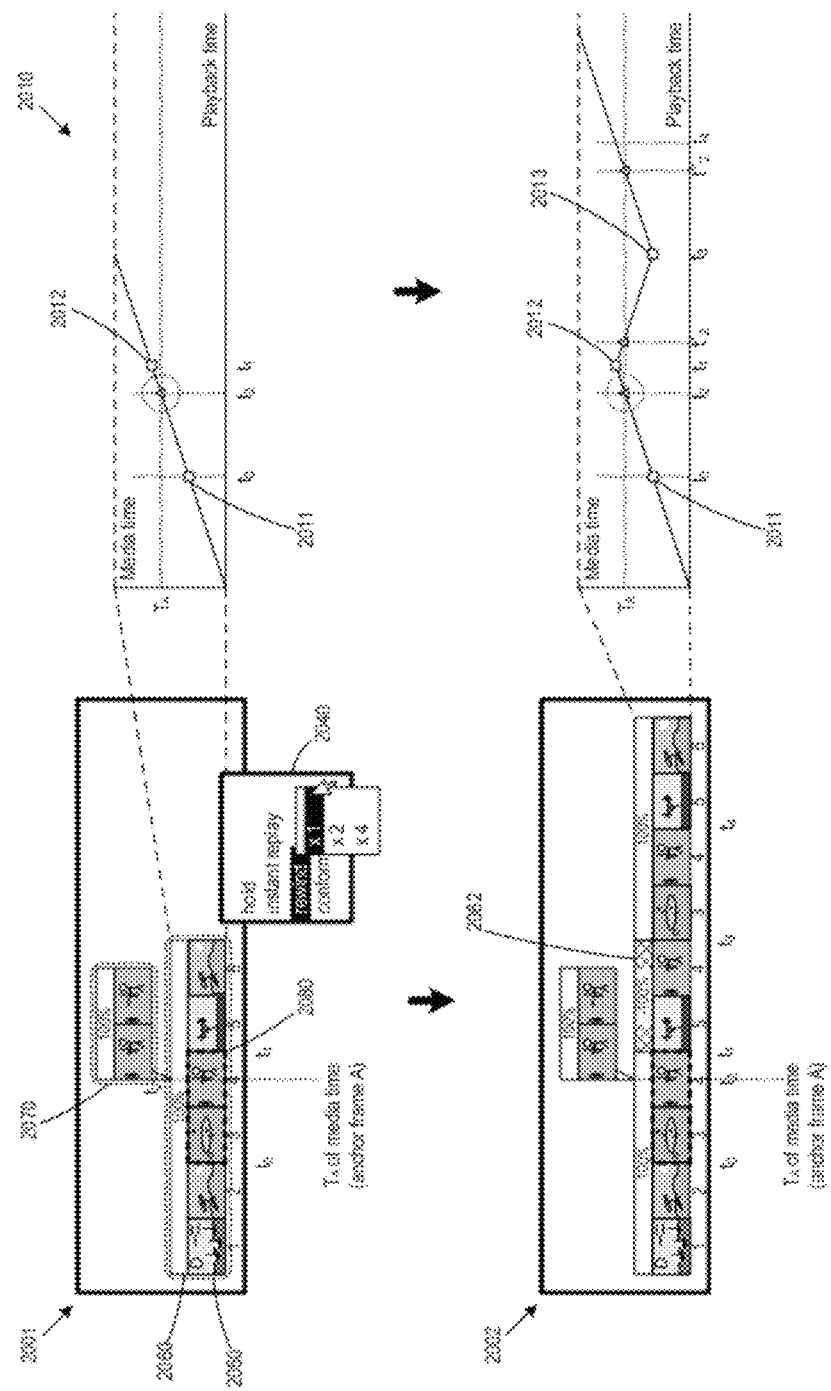
FIGS. 20a-b illustrate the determination of the intended anchor playback time following an example retiming operation that repeat a portion of a media clip.
Figure 20B:
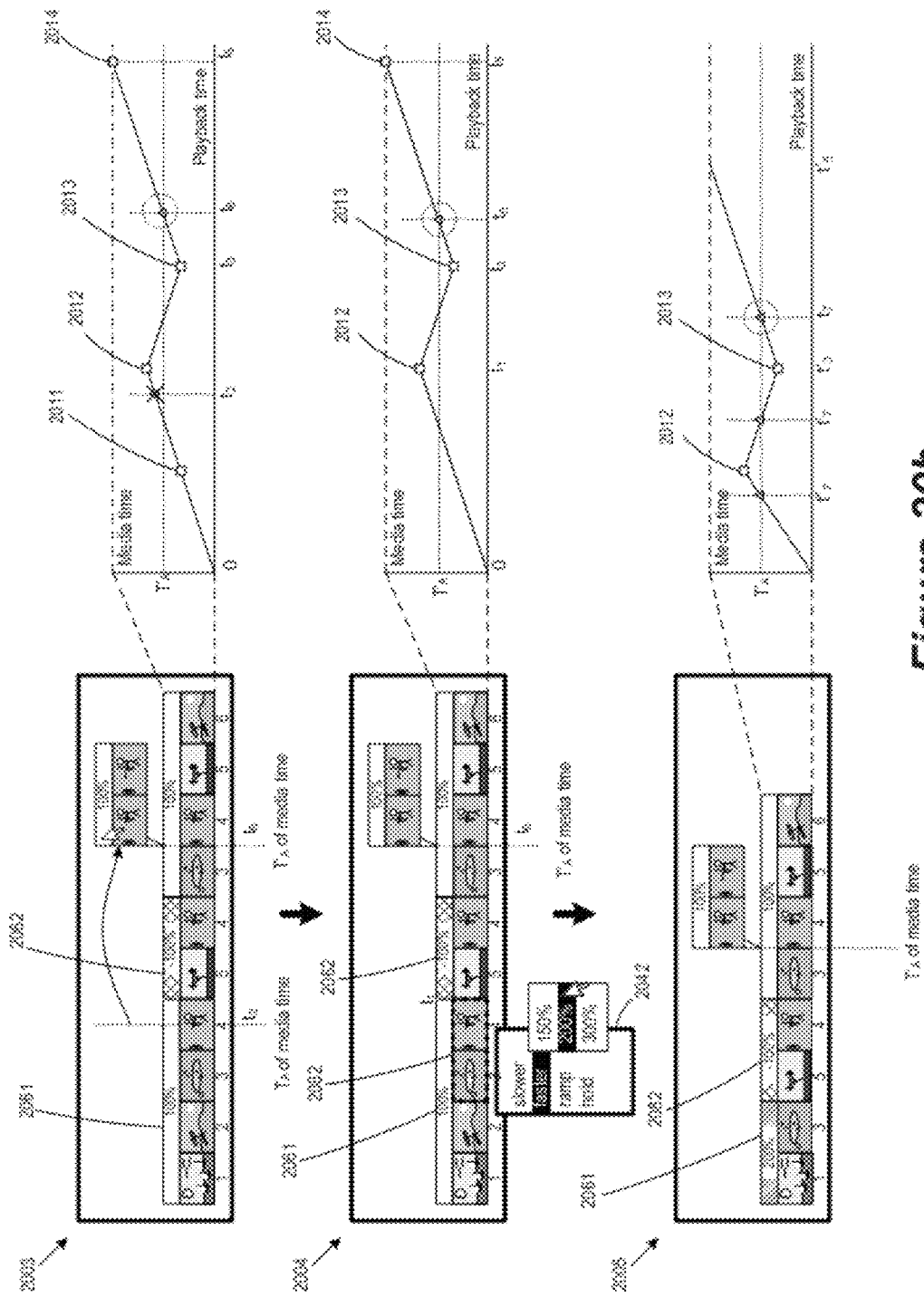

FIGS. 20*a-b* illustrate the determination of the intended anchor playback time following an example retiming operation that repeat a portion of a media clip. FIGS. 20*a-b* illustrate a timeline 2000 of a GUI similar to the GUI 700 of a media editing application. Within the timeline 2000 is a media clip (or media container) 2050 that is the central compositing lane of the composite presentation being composed in the timeline 2000. The media clip displays an effects bar 2060 that indicates the playback speed of the media content in the media clip 2050. The media clip also displays a series of thumbnail images sampled at regular intervals of the playback time from the images in the media clip 2050. FIG. 20*a-b* also illustrates a playback curve 2010 associated with the media clip 2050. In addition to the media clip 2050, the timeline 2000 includes an anchored clip 2070 that is anchored to an anchor frame (frame A) by an earlier user interaction with the anchored clip (e.g., initial creation of the anchored clip by selecting a video clip from a media library).

FIGS. 20*a-b* illustrate the determination of the intended anchor playback time following a rewind retiming operation in five stages 2001-2005. The first stage 2001 shows the position of the anchored clip relative to the central compositing lane 2050 prior to the rewind operation. The anchor frame (frame A) is at playback time t2. A range 2080 has been selected by an earlier range selection operation. The range 2080 starts at playback time t0 and ends at playback time t1. The first stage 2001 also illustrates the selection of a rewind preset at ×1 speed from an effects menu 2040. The selected rewind operation will be performed based on the selected range 2080.

The playback curve 2000 includes two keyframes 2011 and 2012 at playback time t0 and playback time t1 that corresponds to the selected range 2080. The anchor frame (frame A) is at playback time t2, which maps to an anchor media time $T_A$ according to the playback curve 2010. The insertion of the keyframes 2011 and 2012 places the anchor for the anchored clip 2070 in a section of the playback curve defined by the keyframes 2011 and 2012. The media editing application thus marks section defined by these two keyframes as being associated with the anchored clip 2070 for future reverse mapping of anchor playback time.

The second stage 2002 shows the result of the rewind operation. As illustrated, the rewind operation has created a new section 2062 at −100% playback speed (rewind at ×1 speed). The rewind operation also caused the media content between t0 and t1 to repeat three times: forward from t0 to t1, reverse from t1 to t3, and forward again from t3 to t4. The playback curve 2010 similarly shows the repetition of media content: forward from keyframe 2011 at t0 to the keyframe 2012 at t1, reverse from the keyframe 2012 at t1 to a new keyframe 2013 at t3, and forward from the keyframe 2013 to playback time t4. The anchor media time $T_A$, as a result of the rewind operation, thus maps to three playback times at t2, t'2 and t"2.

Since the last user interaction with the anchored clip anchors the anchored clip to the section of the playback curve between 2010 between the keyframes 2011 and 2012, some embodiments use this information to uniquely map the anchor media time $T_A$ to the anchor playback time t2, which is between the keyframes 2011 and 2012.

The third stage 2003 shows a user action that moves the anchored clip 2070 from t2 to a new playback time t6. The new playback time is mapped to a new anchor media time $T'_A$. This user action now becomes the last user action associated with the anchored clip 2070, and the section between the keyframe 2013 and the keyframe 2014 (at the end of the playback curve at t5) is marked for future mapping of the new anchor media time $T'_A$.

The fourth stage 2004 shows the selection of another range 2082 and the invocation of another retiming operation to be applied to the selected range. The range 2081 starts at the beginning of the playback curve at playback time 0 and ends at t1. An effects menu 2042 is used to select a "faster" retiming preset that changes the media content within the range 2082 to playback at 200% of the normal speed.

The final stage 2005 shows the result of the "faster" retiming operation and the new playback time for the anchored clip 2070. The effects bar section 2061 corresponds to the selected range 2082 and indicates playback speed of 200%. The media content subsequent to the selected range have all shifted due to the increase in playback speed in the section 2061. After the "faster" retiming operation, the anchor media time $T'_A$ maps to three different playback times t7, t'7 and t"7. Since t7 is the only playback time mapped by the playback curve to fall between the keyframe 2013 and 2014, the media editing application determines that t7 as the unique anchor playback time for the anchored clip 2070.

V. Software Architecture

Figure 21:
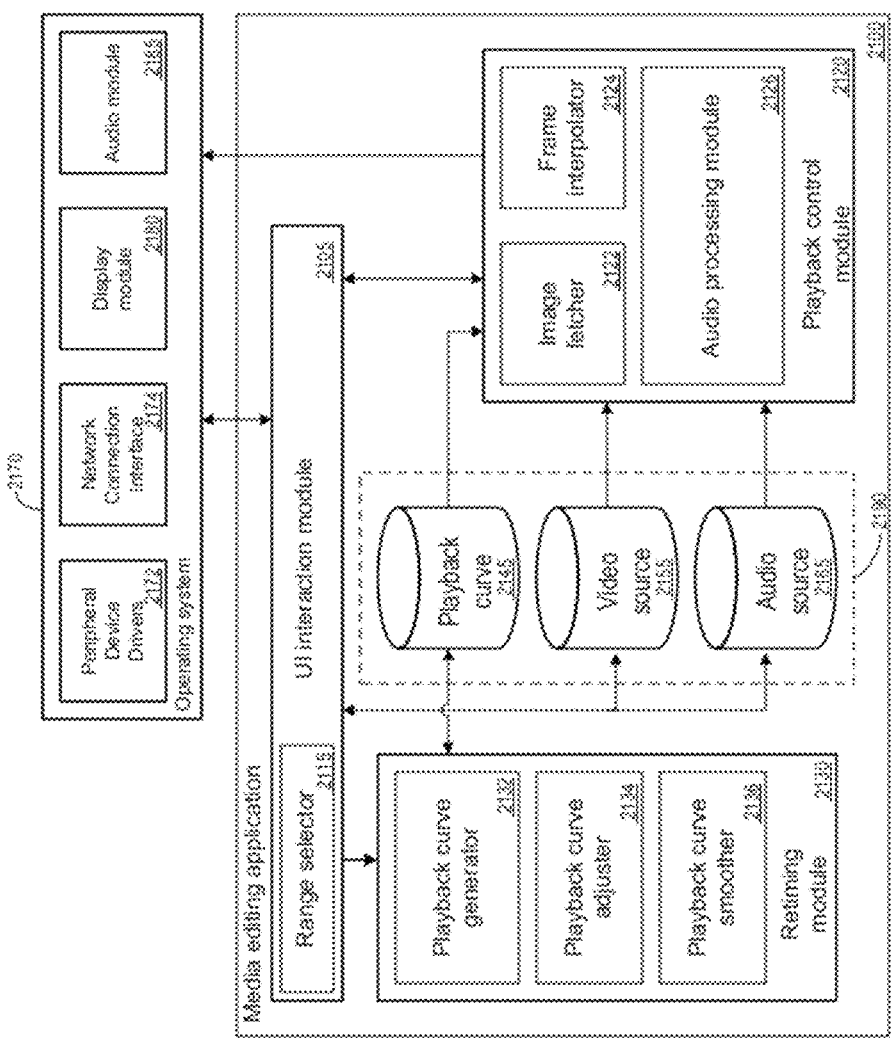
FIG. 21 conceptually illustrates the software architecture of a media editing application 2100 of some embodiments.

In some embodiments, the processes described above are implemented as software running on a particular machine, such as a computer or a handheld device, or stored in a computer readable medium. FIG. 21 conceptually illustrates the software architecture of a media editing application 2100 of some embodiments. In some embodiments, the media editing application is a stand-alone application or is integrated into another application, while in other embodiments the application might be implemented within an operating system. Furthermore, in some embodiments, the application is provided as part of a server-based solution. In some of these embodiments, the application is provided via a thin client. That is, the application runs on a server while a user interacts with the application via a separate machine that is remote from the server. In other such embodiments, the application is provided via a thick client. That is, the application is distributed from the server to the client machine and runs on the client machine.

The media editing application 2100 includes a user interface (UI) interaction module 2105, a retiming module 2130, and a playback control module 2120. The media editing application 2100 also includes playback curve storage 2145, video source storage 2155, and audio source storage 2165. In some embodiments, storages 2145, 2155, and 2165 are all stored in one physical storage 2190. In other embodiments, the storages are in separate physical storages, or two of the storages are in one physical storage, while the third storage is in a different physical storage. For instance, the video source storage 2155 and the audio source storage 2165 will often not be separated in different physical storages.

FIG. 21 also illustrates an operating system 2170 that includes input device driver(s) 2172, a network connection interface(s) 2174, a display module 2180 and an audio module 2185. In some embodiments, as illustrated, the input device drivers 2172, the network connection interfaces 2174, the display module 2180 and the audio module 2185 are part of the operating system 2170, even when the media editing application 2100 is an application separate from the operating system.

The input device drivers 2172 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interaction module 2105.

The media editing application 2100 of some embodiments includes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2180 translates the output of a user interface for a display device. That is, the display module 2180 receives signals (e.g., from the UI interaction module 2105) describing what should be displayed and translates these signals into pixel information that is sent to the display device. The display device may be an LCD, plasma screen, CRT monitor, touchscreen, etc. In some embodiments, the display module 2180 also receives signals from the playback control module 2120 for displaying video images from a composite presentation that the media editing application is composing.

The audio module 2185 translates the output of a user interface for a sound producing device that translates digital audio signals into actual sounds. In some embodiment, the audio module 2185 also receives digital audio signals from the playback control module for playing sound produced from a composite presentation the media editing application is composing.

The network connection interface 2174 enable the device on which the media editing application 2100 operates to communicate with other devices (e.g., a storage device located elsewhere in the network that stores the raw audio data) through one or more networks. The networks may include wireless voice and data networks such as GSM and UMTS, 802.11 networks, wired networks such as Ethernet connections, etc.

The UI interaction module 2105 of media editing application 2100 interprets the user input data received from the input device drivers 2172 and passes it to various modules, including the retiming module 2130 and the playback control module 2120. The UI interaction module also manages the display of the UI, and outputs this display information to the display module 2180. This UI display information may be based on information from the playback control module 2120 or directly from the video source storage 2155 and audio source storage 2165. In some embodiments, the UI interaction module 2105 includes a range selector module 2115 for processing user selection of a range in a media clip for retiming operation.

The playback curve storage 2145 receives and stores playback curve generated and adjusted by the retiming module 2130. The playback curve stored can be accessed for further adjustment by the retiming module, or be accessed and used to retrieve images from the video source 2155 and audio source 2165 by the playback control module 2120. The video source storage 2155 receives and stores video data from the UI interaction module 2105 or an operating system 2170. The audio source storage 2165 likewise receives and stores audio data from the UI interaction module and the operating system 2170.

The retiming module (or retiming engine) 2130 generates and adjusts playback curves. In some embodiments, the retiming module generates a new playback curve and stores it in the playback curve storage 2145 whenever a new media clip or a new media clip is created. The retiming module also receives retiming commands and associated parameters from the UI interaction module 2105. The retiming module 2130 uses the received retiming command to insert keyframes and adjust the playback curve. In addition to adjusting the curve according to retiming, the retiming module 2130 also performs curve smoothing operation on the playback curve.

The playback control module 2120 retrieves images from the video source storage 2155 and produces video frames for display at the display module 2180. The playback control module fetches the images based on the playback curve stored in the playback curve storage 2145 and produces interpolated frames for the display module 2180. The playback control module 2120 also produces audio for the audio module 2185 in the operating system 2170 based on audio data retrieved from the audio source storage 2165 and the playback curve.

While many of the features have been described as being performed by one module (e.g., the playback control module 2120 and the retiming module 2130) one of ordinary skill in the art will recognize that the functions described herein might be split up into multiple modules. Similarly, functions described as being performed by multiple different modules might be performed by a single module in some embodiments. For example, the retiming module 2130 can be implemented using sub-modules such as a playback curve generator 2132, a playback curve adjuster 2134 and a playback curve smoother 2136. The playback curve generator 2132 generates playback curves. The playback curve adjuster 2134 adjusts playback curves according to retiming commands. The playback curve smoother 2136 performs curve smoothing operation on the playback curve. Likewise the playback control module 2120 can be implemented using sub-modules such as an image fetcher 2122, a frame interpolator 2124 and an audio processing module 2126. The frame interpolator 2124 creates interpolated frame based on the fetched video images and the playback curve. The image fetcher fetches video images from the video source storage 2155 based on playback time instant and the playback curve 2145. The audio processing module 2126 likewise uses playback curve 2145 to determine both the playback speed and the playback position (in media time) of the audio.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
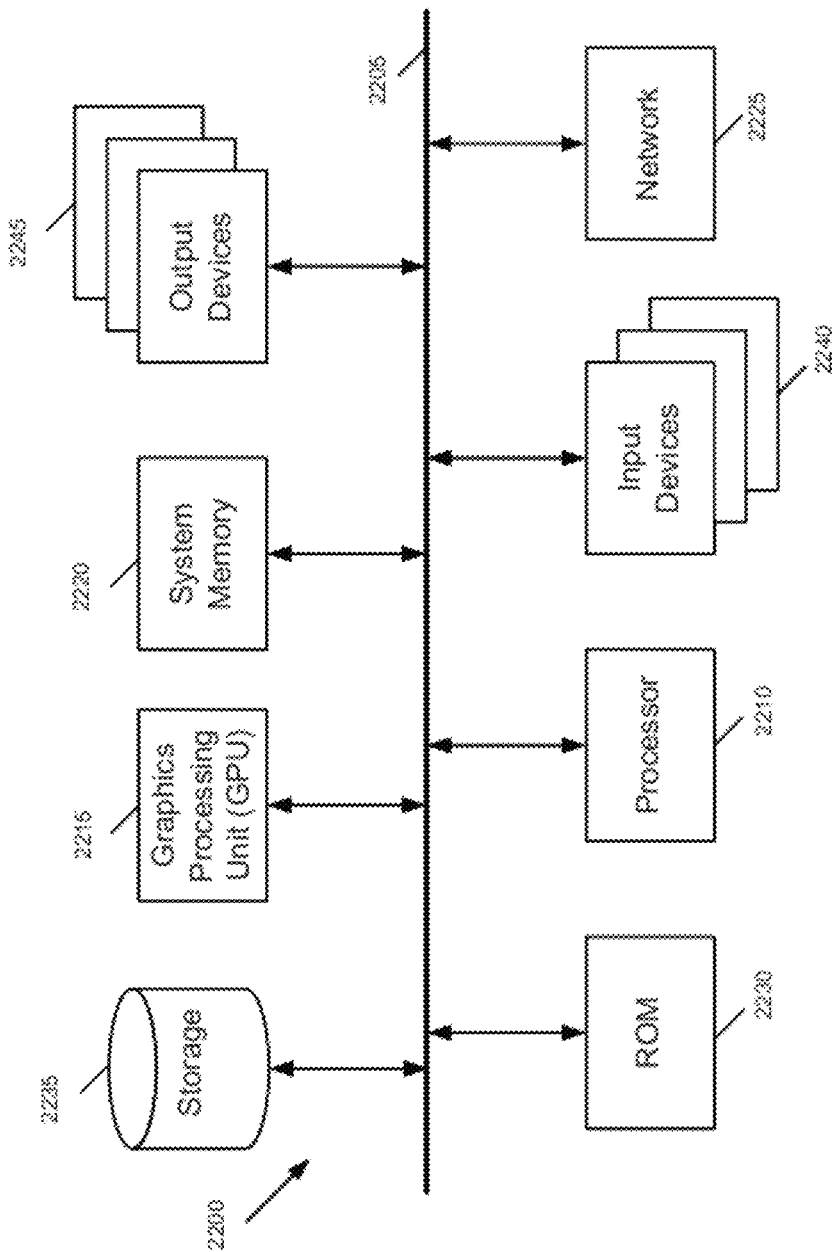
FIG. 22 conceptually illustrates a computer system with which some embodiments of the invention are implemented.

FIG. 22 conceptually illustrates an electronic system 2200 with which some embodiments of the invention are implemented. The electronic system 2200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2200 includes a bus 2205, processing unit(s) 2210, a graphics processing unit (GPU) 2215, a system memory 2220, a network 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2215, the system memory 2220, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash memory device, etc., and its corresponding disk drive) as the permanent storage device. Like the permanent storage device 2235, the system memory 2220 is a read-and-write memory device. However, unlike storage device 2235, the system memory 2220 is a volatile read-and-write memory, such a random access memory. The system memory 2220 stores some of the instructions and data that the processor needs at runtime. In some embodiments, the invention's processes are stored in the system memory 2220, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2225 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3 and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of defining a media editing application for creating multimedia presentations, the method comprising:
   defining a composite display area for displaying a graphical representation for each media clip in a set of media clips that are parts of a composite presentation;
   defining a range selector for selecting a portion of a graphical representation of a media clip that is displayed in the composite display area;
   defining a user interface item for presenting at least three selectable predefined retiming operations, wherein each predefined retiming operation performs a different playback speed modification to the media clip;
   defining a retiming engine for applying a selected predefined retiming operation to a range of the media clip that corresponds to the portion of the graphical representation selected by the range selector in order to change a playback timing of the range of the media clip according to the playback speed modification of the selected predefined retiming operation; and
   defining a playback curve that specifies a relationship between the media clip and a playback timing of the media clip,
   wherein the retiming engine adjusts the playback curve according to a spline interpolation,
   wherein the spline interpolation is based on one or more keyframes associated with the playback curve, each keyframe associated with a position in the media clip that is determined by the application of the selected predefined retiming operation.

2. The method of claim 1, wherein the spline interpolation is based on Monotone Cubic Interpolation.

3. The method of claim 1, wherein the spline interpolation maintains monotonicity of the playback curve between two keyframes.

4. The method of claim 1, wherein the retiming engine adjusts the playback curve according to one of the plurality of predefined retiming operations.

5. The method of claim 4, wherein the playback curve is further associated with a keyframe that marks a particular position in the media clip, wherein adjusting the playback curve comprises defining the particular position of the key frame.

6. The method of claim 1 further comprising defining a frame interpolator for creating an interpolated video frame based on a source of the media clip and the playback curve.

7. The method of claim 1, wherein the selected portion of the graphical representation of the media clip can be adjusted by a user input.

8. The method of claim 1, wherein the changed size of the graphical representation of the media clip indicates a duration of a total playback timing of the media clip.

9. The method of claim 1 wherein a size of the graphical representation of the media clip is changed after applying the selected predefined retiming operation to provide visual feedback of the selected predefined retiming operation.

10. A non-transitory computer readable medium storing a media editing application for creating multimedia presentations, the application comprising a graphical user interface (GUI), the GUI comprising:
    a composite display area for displaying a graphical representation for each media clip in a set of media clips that are parts of a composite presentation;
    a range selector for selecting a portion of a graphical representation of a media clip that is displayed in the composite display area;
    a user interface item for presenting at least three selectable predefined retiming operations, wherein each predefined retiming operation performs a different playback speed modification to the media clip; and
    a retiming engine for applying a selected predefined retiming operation to a range of the media clip that corresponds to the portion of the graphical representation selected by the range selector in order to change a playback timing of the range of the media clip according to the playback speed modification of the selected predefined retiming operation,
    wherein the retiming engine defines a playback curve that specifies a relationship between the media clip and a playback timing of the media clip,
    wherein the retiming engine adjusts the playback curve according to a spline interpolation based on one or more keyframes associated with the playback curve, each keyframe associated with a position in the media clip that is determined by the application of the selected predefined retiming operation.

11. The GUI of claim 10, wherein the graphical representation of a media clip further comprises a speed indicator for indicating a speed for playing back the range of the media clip.

12. The GUI of claim 11, wherein the speed indicator comprises a plurality of sections, each section of the speed indicator corresponds to a section of the media clip that plays at a different speed.

13. The GUI of claim 11, wherein the speed indicator is partitioned into a plurality of sections according to a playback speed modification of a predefined retiming operation performed by the retiming engine.

14. The GUI of claim 10, wherein the graphical representation of a media clip comprises a plurality of sections that represents different ranges of the media clip that play back at different speeds.

15. The GUI of claim 14, wherein the graphical representation of the media clip further comprises a plurality of thumbnail images that are sampled from the media clip at regular intervals of playback time.

16. The GUI of claim 14, wherein one section of the graphical representation of the media clip comprises a handle for adjusting the playback speed of the corresponding range of the media clip.

17. The GUI of claim 16, wherein said adjusting of the playback speed of the corresponding range of the media clip comprises using the handle to change the length of the section of the graphical representation of the media clip.

18. The GUI of claim 14, wherein one section of the graphical representation of the media clip comprises a handle for adjusting a partitioning between the section and an adjacent section.

19. A non-transitory computer readable medium storing a computer program for execution by one or more processing units, the computer program comprising sets of instructions for:
    defining a composite display area for displaying a graphical representation for each media clip in a set of media clips that are parts of a composite presentation;
    receiving a selection of a portion of a graphical representation of a media clip that is displayed in the composite display area;

receiving a selection of a predefined retiming operation of at least three predefined retiming operations that each perform a different playback speed modification to the media clip;

determining a range of the media clip that corresponds to the selected portion of the graphical representation of the media clip;

modifying a playback timing of the range of the media clip in accordance with the playback speed modification of the selected predefined retiming operation;

defining a playback curve that specifies a relationship between the media clip and the playback timing; and adjusting the playback curve according to a spline interpolation based on one or more keyframes associated with the playback curve, each keyframe associated with a position in the media clip that is determined by the selected predefined retiming operation.

20. The non-transitory computer readable medium of claim 19, wherein the retiming operation further comprises changing a timing of a range of an audio clip that corresponds to the selected portion of the graphical representation of the media clip according to the playback curve, wherein an audio playback speed of a particular instant is determined by a slope of the playback curve at the particular instant.

21. The non-transitory computer readable medium of claim 19, wherein the spline interpolation maintains monotonicity of the playback curve between two keyframes.

22. The non-transitory computer readable medium of claim 19 further comprising adjusting the selected portion of the graphical representation of the media clip according to a user input.

23. The non-transitory computer readable medium of claim 19, where the predefined retiming operation is one of a plurality of user-selectable predefined retiming operations.

24. The non-transitory computer readable medium of claim 19, wherein the predefined retiming operation further changes a timing of a range of an audio clip that corresponds to the selected portion of the graphical representation of the media clip.

25. The non-transitory computer readable medium of claim 19 wherein a size of the selected portion of the graphical representation of the media clip is directly proportional to the modified playback timing of the range of the media clip.

* * * * *